US006286953B1

(12) United States Patent
Takemoto et al.

(10) Patent No.: US 6,286,953 B1
(45) Date of Patent: Sep. 11, 2001

(54) INK JET RECORDING METHOD

(75) Inventors: Kiyohiko Takemoto; Kazuaki Watanabe; Yukari Sano; Kazuhide Kubota, all of Suwa (JP)

(73) Assignee: Seiko Epson Corporation (JP)

( * ) Notice: Subject to any disclaimer, the term of this patent is extended or adjusted under 35 U.S.C. 154(b) by 0 days.

(21) Appl. No.: 09/551,808

(22) Filed: Apr. 18, 2000

Related U.S. Application Data

(62) Division of application No. 08/634,554, filed on Apr. 18, 1996, now Pat. No. 6,084,619.

(30) Foreign Application Priority Data

| Apr. 21, 1995 | (JP) | 7-97241 |
| Apr. 21, 1995 | (JP) | 7-97242 |
| Apr. 21, 1995 | (JP) | 7-97243 |
| Jul. 13, 1995 | (JP) | 7-177447 |
| Jul. 27, 1995 | (JP) | 7-191761 |
| Aug. 11, 1995 | (JP) | 7-205982 |
| Aug. 11, 1995 | (JP) | 7-205984 |
| Aug. 28, 1995 | (JP) | 7-219046 |
| Dec. 1, 1995 | (JP) | 7-313961 |

(51) Int. Cl.$^7$ .................................................. G01D 11/00
(52) U.S. Cl. .......................... 347/100; 347/101; 347/102; 347/96
(58) Field of Search .............................. 347/100, 101, 347/102, 96; 100/31–58

(56) References Cited

U.S. PATENT DOCUMENTS

| 5,488,402 | 1/1996 | Shields et al. ................. 347/96 |
| 5,503,664 | 4/1996 | Sano et al. |
| 5,549,740 | * | 8/1996 | Takahashi et al. ............. 347/100 |
| 5,555,008 | 9/1996 | Stoffel et al. ................. 347/100 |
| 5,635,969 | 6/1997 | Allen .......................... 347/96 |
| 5,696,182 | 12/1997 | Kashiwazaki et al. .......... 523/161 |
| 6,095,644 | * | 8/2000 | Kasamatsu et al. ............ 347/101 |
| 6,102,537 | * | 8/2000 | Kato et al. .................. 347/101 |
| 6,116,728 | * | 9/2000 | Miyake et al. ................ 347/102 |

FOREIGN PATENT DOCUMENTS

| 0481829 | 4/1992 | (EP) . |
| 0534634 | 3/1993 | (EP) . |
| 61-058788 | 3/1986 | (JP) . |
| 61-58788 | 3/1986 | (JP) . |
| 63-19167 | 8/1988 | (JP) . |
| 1114450 | 5/1989 | (JP) . |
| 5202328 | 8/1993 | (JP) . |
| 06106735A | 4/1994 | (JP) . |
| 7195823 | 8/1995 | (JP) . |

OTHER PUBLICATIONS

Derwent English Abstract of Japanese Reference 7–195823 of Aug. 1995.
Patent Abstracts of Japan, English Abstract of Japanese Reference 61058788 of Mar. 1986.
Derwent English Abstract of Japanese Reference 5–202328 of Aug. 1993.
Patent Abstracts of Japan, English Abstract of Japanese Reference 06106735A of Apr. 1994.
Patent Abstracts of Japan, Pub. #61058788, Appln. #JP840182171 of Mar. 1986.
Patent Abstracts of Japan, Pub. #63191671 Appln. #JP870024383, of Aug. 1998.
Abstract of JP1114450, Appln. # 62271839, of May 1989.

* cited by examiner

*Primary Examiner*—John Barlow
*Assistant Examiner*—M Shah
(74) *Attorney, Agent, or Firm*—Ladas and Parry

(57) ABSTRACT

An ink jet recording method capable of providing an image having a good quality is disclosed. In the ink jet recording method, a reaction solution and an ink composition are used to conduct printing on a recording medium. The reaction solution comprises a polyvalent metal salt, and an ink composition comprises a pigment and a resin emulsion.

8 Claims, 4 Drawing Sheets

INK JET RECORDING METHOD

This application is a divisional of application(s) application number Ser. No. 08/634,554 filed on Apr. 18 1996 U.S. Pat. No. 6,084,619.

BACKGROUND OF THE INVENTION

1. Field of the Invention

The present invention relates to an ink jet recording method. More particularly, the present invention relates to an ink jet recording method wherein a reaction solution and an ink composition are deposited onto a recording medium.

2. Background Art

An ink jet recording method is a printing method wherein droplets of an ink composition are ejected and deposited onto a recording medium such as paper. This method has a feature that an image having a high resolution and a high quality can be realized at a high speed with a relatively inexpensive apparatus. In general, the ink composition used in the ink jet recording method comprises water as a main component and, added thereto, a colorant and a wetting agent such as glycerin added for prevention of clogging and other purposes.

On the other hand, a new ink jet recording method has been recently proposed. The new method comprises applying a polyvalent metal salt solution onto a recording medium and then applying an ink composition containing a dye having at least one carboxyl group (e.g., Japanese Patent Laid-Open No. 202328/1993). According to this method, polyvalent metal ions combine with the dye to form an insoluble composite which can provide an image having water resistance and a high quality free from color bleeding.

Further, an ink jet recording method has been proposed wherein a color ink containing at least a surfactant or a penetrable solvent and a salt for imparting a penetrating property is used in combination with a black ink which cooperates with the salt to cause thickening or coagulation, thereby providing a high-quality color image having a high image density and free from color bleeding (Japanese Patent Laid-Open No. 106735/1994). More specifically, in this method, two liquids, i.e., a first liquid containing a salt and a second liquid of an ink composition, are printed to provide a good image.

Furthermore, other ink jet recording methods wherein two liquids are printed have been proposed, for example, in Japanese Patent Laid-Open No. 240557/1991 and No. 240558/1991.

SUMMARY OF THE INVENTION

The present inventors have now found that, in the above ink jet recording method wherein two liquids are printed, the use of a specific reaction solution in combination with a particular ink composition can provide a good print. The present invention has been made based on such finding.

Accordingly, an object of the present invention is to provide a good image by using an ink jet recording method wherein two liquids are printed.

The first aspect of the present invention provides an ink jet recording method comprising the step of depositing a reaction solution and an ink composition onto a recording medium, wherein the reaction solution comprises a polyvalent metal salt, and wherein the ink composition comprises a pigment and a resin emulsion.

The second aspect of the present invention provides an ink jet recording method comprising the step of depositing a reaction solution and an ink composition onto a recording medium, wherein the reaction solution comprises a polyallylamine or a derivative thereof, and wherein the ink composition comprises a colorant and a resin emulsion.

The third aspect of the present invention provides an ink jet recording method comprising the step of depositing a reaction solution and an ink composition onto a recording medium, wherein the reaction solution comprising a polyvalent metal salt, and wherein the ink composition comprises a colorant and an alginic acid derivative.

The forth aspect of the present invention provides an ink jet recording method comprising the step of depositing a reaction solution and an ink composition onto a recording medium, wherein the reaction solution comprises a polyvalent metal salt and a polyol having a vapor pressure of not more than 0. 01 mmHg at 20° C., wherein the content of the polyol is such that the weight ratio of the polyol to the polyvalent metal salt is 1 or more, and wherein the ink composition comprises a colorant and a resin emulsion.

The fifth aspect of the present invention provides an ink jet recording method comprising the step of depositing a reaction solution and an ink composition onto a recording medium, wherein the polyvalent metal salt is composed of nitric acid ion or a salt of carboxylic acid ion and polyvalent metal ion.

The sixth aspect of the present invention provides an ink jet recording method comprising the step of depositing a reaction solution and an ink composition onto a recording medium, wherein the reaction solution comprises a polyvalent metal salt and has a surface tension of not more than 35 mN/m, and wherein the ink composition comprises a colorant and has a surface tension of not more than 40 to 55 mN/m.

The seventh aspect of the present invention provides an ink jet recording method comprising the step of depositing a reaction solution and an ink composition onto a recording medium, wherein the reaction solution comprises a polyvalent metal salt, and wherein the ink composition comprising a colorant, water, and an emulsion of a thermoplastic resin, the method further comprising the step of heating the recording medium with the ink composition deposited thereon to the softening temperature of the thermoplastic resin or a higher temperature.

DETAILED DESCRIPTION OF THE INVENTION

Ink jet recording method

Figure 1:
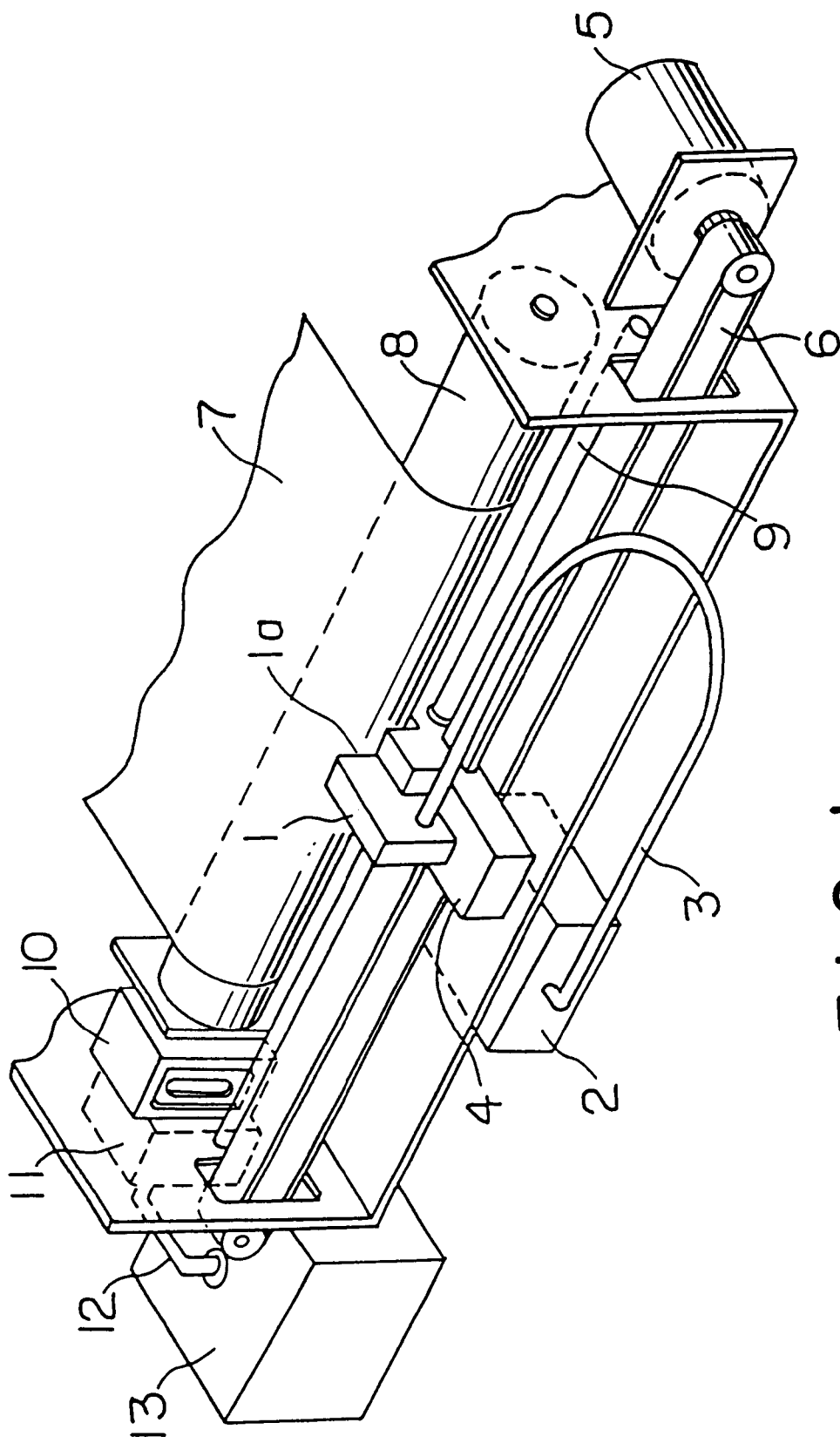
FIG. 1 shows an embodiment of the ink jet recording apparatus according to the present invention, wherein a recording head is provided separately from an ink tank to feed an ink composition and a reaction solution into a recording head through an ink tube.

The ink jet recording method according to the present invention comprises the step of depositing a reaction solution and an ink composition onto a recording medium.

In the first aspect of the present invention, the reaction solution comprises a polyvalent metal salt, and the ink composition comprises a pigment, water, and a resin emulsion.

This embodiment can prevent feathering of an ink and uneven printing on a recording medium. This can also offer an additional advantage that uneven color-to-color mixing in the boundary of different colors, which becomes a problem in a color ink jet recording method, i.e., color bleeding, can be effectively prevented.

In the second aspect of the present invention, the reaction solution comprises a polyallylamine or a derivative thereof, and the ink composition comprises a colorant, water, and a resin emulsion.

This embodiment can prevent feathering of an ink and uneven printing on a recording medium and, at the same time, offer an additional advantage that color bleeding can be effectively prevented.

In the third aspect of the present invention, the reaction solution comprises a polyvalent metal salt, and the ink composition comprises an alginic acid derivative.

This embodiment can prevent feathering of an ink and uneven printing on a recording medium, form dots having high circularity, can realize a high print density. This can also offer an additional advantage that color bleeding can be effectively prevented.

In the fourth aspect of the present invention, the reaction solution comprises a polyvalent metal salt and a polyol, having a vapor pressure of not more than 0.01 mmHg at 20° C., in such an amount that the weight ratio of the polyol to the polyvalent metal salt is 1 or more.

This reaction solution is stable and is much less likely to create precipitates causative of clogging of a nozzle. Therefore, stable printing can be realized. Further, curling of recording paper can be effectively prevented.

In the fifth aspect of the present invention, the reaction solution comprises a polyvalent metal salt, and the ink composition comprises a pigment and a resin emulsion, and, further, the polyvalent metal salt contained in the reaction solution is composed of nitric acid ion or a salt of carboxylic acid ion and polyvalent metal ion.

This embodiment is advantageous in that good printing can be realized for a long period without creating clogging of a nozzle with any of the reaction solution and the ink composition.

In the sixth aspect of the present invention, the reaction solution comprises a polyvalent metal salt, and the reaction solution has a surface tension of not more than 35 mN/m with the surface tension of the ink composition being 40 to 55 mN/m.

This embodiment can provide a good image. Specifically, according to this embodiment, neither significant feathering nor uneven printing occurs. It is also possible to provide a printed image having a high OD value and excellent rubbing resistance. Further, this embodiment is suitable for realizing a reduction in size of a recording head and an increase in printing speed.

According to a preferred embodiment of the present invention, the surface tension of reaction solution is 25 to 35 mN/m with the surface tension of ink composition being preferably 40 to 50 mN/m. This enables a high-quality print to be more stably provided regardless of the order of deposition of the reaction solution and the ink composition. According to another preferred embodiment of the present invention, the reaction solution and the ink composition each have a viscosity at 20° C. in the range of from 1.5 to 10 mPa.s, more preferably in the range of from 1.5 to 6 mPa.s. Further, preferably, the viscosity of the reaction solution is substantially equal to that of the ink composition. For example, the viscosity of one of the reaction solution and the ink composition is brought to 50 to 200% of that of the other one. This is advantageous in that, when both the reaction solution and the ink composition are ejected through an ink Jet recording head, the construction of the recording head, passage, and driving circuit for the reaction solution may be identical with that for the ink composition.

In the seventh aspect of the present invention, the reaction solution comprises a polyvalent metal salt, the ink composition comprises a resin emulsion having a disperse phase comprising a thermoplastic resin, and, in addition, the step of heating a recording medium after printing to the softening temperature of the thermoplastic resin or a higher temperature is provided.

Although the step of heating may be conducted simultaneously with printing, it is preferably conducted a certain period after the completion of the printing. This is because the provision of a certain period of time between the completion of the printing and the initiation of the step of heating enables the print to be fully fixed onto the recording medium by virtue of an interaction between the resin emulsion and the polyvalent metal ions. Satisfactory fixation followed by heating to form a film of a print can provide a print having better rubbing resistance (for example, line marking resistance). Further, the embodiment wherein heating is carried out after printing is advantageous in that since the recording head can be physically separated from the heating means, the heat is less likely to affect the recording head, as compared with the embodiment wherein printing and heating are simultaneously carried out. Further, in the embodiment wherein heating is carried out simultaneously with printing, the printing speed should be, in some cases, decreased in order to ensure the time for attaining satisfactory heating effect. By contrast, in the embodiment wherein heating is carried out after printing, the heating effect can be increased, for example, by increasing the heating area, offering increased degree of freedom of means usable for increasing the heating effect. This offers an additional advantage that the printing speed can be increased.

The period of time between the completion of the printing and the initiation of the step of heating may be suitably determined so as to provide the contemplated effect. However, it is generally about 0.1 to 60 sec, preferably about 1 to 30 sec.

In the present inventio, when the reaction solution and the ink composition are applied to a recording medium, the order of application is not particularly limited. Specifically, the reaction solution may be first deposited onto the recording medium followed by the application of the ink composition onto the recording medium with the reaction solution deposited thereon. Alternatively, other methods may be used including one wherein the reaction solution is deposited after printing the ink composition and one wherein the reaction solution and the ink composition are mixed together immediately before or immediately after the ejection.

Reaction solution

As described above, the reaction solution used in the present invention basically comprises at least a polyvalent metal salt or a polyallylamine.

The polyvalent metal salt usable in the reaction solution is composed of divalent or higher polyvalent metallic ions and anions and is soluble in water. Specific examples of polyvalent metallic ions include divalent metallic ions, such as $Ca^{2+}$, $Cu^{2+}$, $Ni^{2+}$, $Mg^{2+}$, $Zn^{2+}$, and $Ba^{2+}$, trivalent metallic ions, such as $Al^{3+}$, $Fe^{3+}$, and $Cr^{3+}$. Anions include $Cl^-$, $NO_3^-$, $I^-$, $Br^-$, $ClO_3^-$, and $CH_3COO^-$.

In particular, a metal salt constituted by $Ca^{2+}$ or $Mg^{2+}$ provides favorable results in terms of pH of the reaction solution and the quality of prints.

The concentration of the polyvalent metal salt in the reaction solution may be suitably determined so as to attain the effect of providing a good print quality and preventing clogging. It, however, is preferably about 0.1 to 40% by weight, more preferably about 5 to 25% by weight.

According to the fifth aspect of the present invention, the polyvalent metal salt is composed of divalent or higher polyvalent metallic ions and nitrate ions or carboxylate ions and is soluble in water.

Furthermore, preferably, the carboxylate ions are derived from a saturated aliphatic monocarboxylic acid having 1 to 6 carbon atoms or a carbocyclic monocarboxylic acid having 7 to 11 carbon atoms. Preferred examples of the saturated aliphatic monocarboxylic acid having 1 to 6 carbon atoms include formic acid, acetic acid, propionic acid, butyric acid, isobutyric acid, valeric acid, isovaleric acid, pivalic acid, and hexanoic acid. Among them, formic acid and acetic acid are particularly preferred.

A hydrogen atom(s) on the saturated aliphatic hydrocarbon residue in the monocarboxylic acid may be substituted by a hydroxyl group. Preferred examples of such carboxylic acids include lactic acid.

Preferred examples of the carbocyclic monocarboxylic acid having 6 to 10 carbon atoms include benzoic acid and naphthoic acid with benzoic acid being more preferred.

The polyallylamines and polyallylamines derivative usable in the reaction solution are cationic polymers which are soluble in water and can be positively charged in water. Such polymers include, for example, those represented by the following formulae (II), (III) and (IV):

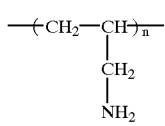

(II)

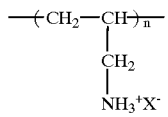

(III)

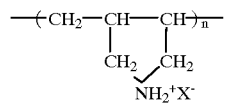

(IV)

wherein $X^-$ represents at least one member selected from chloride, bromide, iodide, nitrate, phosphate, sulfate, acetate and other ions.

In addition, a copolymer of an allylamine with a diallylamine and a copolymer of diallylmethylammmonium chloride with sulfur dioxide may also be used.

The content of the polyallylamine and the polyallylamine derivative is preferably 0.5 to 10% by weight based on the reaction solution.

According to a preferred embodiment of the present invention, the reaction solution may contain a polyol in addition to polyvalent metal salt. The polyol has a vapor pressure of not more than 0.01 mmHg at 20° C. The amount of the polyol added is such that the weight ratio of the polyol to the polyvalent metal salt is not less than 1, preferably 1.0 to 5.0. Further, according to a preferred embodiment of the present invention, the amount of the polyol added is preferably not less than 10% by weight, more preferably about 10 to 30% by weight, based on the reaction solution.

Specific examples of preferred polyols include polyhydric alcohols, for example, glycerin, diethylene glycol, triethylene glycol, 1,5-pentanediol, and 1,4-butanediol. Further specific examples of preferred polyols include saccharides, for example, monosaccharides, disaccharides, oligosaccharides (including trisaccharides and tetrasaccharides), and other polysaccharides, preferably glucose, mannose, fructose, ribose, xylose, arabinose, galactose, aldonic acid, glucitol, sorbitol, maltose, cellobiose, lactose, sucrose, trehalose, and maltotriose.

These polyols may be added alone or as a mixture of two or more. When the polyols are used as a mixture of two or more, the amount of the mixture added is such that the weight ratio of the total amount of the two or more polyols to the polyvalent metal salt is not less than 1.

According to a preferred embodiment of the present invention, the reaction solution may comprise a wetting agent comprising a high-boiling organic solvent. The high-boiling organic solvent serves to prevent the reaction solution from being concentrated due to evaporation, thus preventing clogging of a recording head. Preferred examples of high-boiling organic solvents, some of which are those described above in connection with the polyol, include polyhydric alcohols such as ethylene glycol, diethylene glycol, triethylene glycol, polyethylene glycol, polypropylene glycol, propylene glycol, butylene glycol, 1,2,6-hexanetriol, thioglycol, hexylene glycol, glycerin, trimethylolethane, and trimethylolpropane; alkyl ethers of polyhydric alcohols, such as ethylene glycol monomethyl ether, ethylene glycol monobutyl ether, diethylene glycol monomethyl ether, diethylene glycol monoethyl ether, diethylene glycol monobutyl ether, triethylene glycol monomethyl ether, and triethylene glycol monoethyl ether, and triethylene glycol monobutyl ether; urea, 2-pyrrolidone, N-methyl-2-pyrrolidone, 1,3-dimethyl-2-imidazolidinone, and triethanolamine.

Although the amount of the high-boiling organic solvent added is not particularly limited, it is preferably about 0.5 to 40% by weight, more preferably about 2 to 20% by weight.

According to a preferred embodiment of the present invention, the reaction solution may comprise a low-boiling organic solvent. Preferred examples of low-boiling organic solvents usable herein include methanol, ethanol, n-propyl alcohol, iso-propyl alcohol, n-butanol, sec-butanol, tert-butanol, iso-butanol, and n-pentanol. Monohydric alcohols are particularly preferred. The low-boiling organic solvent has the effect of shortening the time taken for drying the ink. The amount of the low-boiling organic solvent added is preferably in the range of from 0.5 to 10% by weight, more preferably in the range of from 1.5 to 6% by weight.

According to a preferred embodiment of the present invention, the reaction solution may comprise a penetrating agent. Penetrating agents usable herein include various surfactants such as anionic, cationic, and amphoteric surfactants; alcohols such as methanol, ethanol, and iso- propyl alcohol; and lower alkyl ethers of polyhydric alcohols, such as ethylene glycol monomethyl ether, diethylene glycol monoethyl ether, diethylene glycol monobutyl ether, triethylene glycol monobutyl ether, propylene glycol monobutyl ether, and dipropylene glycol monobutyl ether.

More preferred penetrating agents usable in the present invention include compounds represented by the following formula 1 and lower alcohol ethers of polyhydric alcohols.

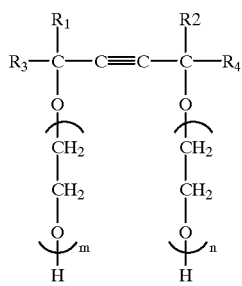

(I)

wherein $0 \leq m+n \leq 50$ and $R^1$, $R^2$, $R^3$, and $R^4$ each independently represent an alkyl group.

Specific preferred examples of compounds represented by the formula 1 include OLFINE Y, Surfynol 82, Surfynol 440, Surfynol 465, and Surfynol 485 (all the above products being manufactured by Air Products and Chemicals Inc.). They may be added alone or in a combination of two or more.

According to a preferred embodiment of the present invention, the reaction solution may contain triethanolamine for pH adjustment purposes. When triethanolamine is added, the amount thereof is preferably about 0 to 2.0% by weight.

Further, a colorant, e.g., yellow, magenta, or cyan colorant, may be added to the reaction solution so that the colored reaction solution can serve also as the ink composition described below in the paragraph of "Ink composition."

Ink composition

In the present invention, the term "ink composition" refers to a black ink composition in the case of black-and-white printing and a color ink composition in the case of color printing, specifically a yellow ink composition, a magenta ink composition, and a cyan ink composition and, optionally, a black ink composition.

The ink composition used in the present invention comprises at least a colorant and water.

According to a preferred embodiment of the present invention, the ink composition comprises a resin emulsion. The term "resin emulsion" used herein refers to an emulsion comprising water as a continuous phase and the following resin component as a dispersed phase. Resin components as the dispersed phase include acrylic resin, vinyl acetate resin, styrene/butadiene resin, vinyl chloride resin, (meth)acrylate/styrene resin, butadiene resin, styrene resin, crosslinked acrylic resin, crosslinked styrene resin, benzoguanamine resin, phenolic resin, silicone resin, and epoxy resin.

According to a preferred embodiment of the present invention, the resin is a polymer having a combination of a hydrophilic segment with a hydrophobic segment. The particle diameter of the resin component is not particularly limited so far as the resin component forms an emulsion. It, however, is preferably not more than about 150 nm, more preferably about 5 to 100 nm.

The resin emulsion may be prepared by subjecting a monomer(s) for forming a contemplated resin to dispersion polymerization in water optionally in the presence of a surfactant. For example, an emulsion of an acrylic resin or a styrene/acrylic resin may be prepared by subjecting an ester of (meth)acrylic acid or alternatively an ester of (meth)acrylic acid in combination with styrene to dispersion polymerization in water optionally in the presence of a surfactant. In general, the ratio of the resin component to the surfactant is preferably about 10:1 to 5:1. When the amount of the surf actant used falls within the above range, it is possible to provide an ink which has good water resistance in the form of an image and good penetrability. The surfactant is not particularly limited. Preferred examples thereof include anionic surfactants (for example, sodium dodecylbenzenesulfonate, sodium laurate and an ammonium salt of a polyoxyethylene alkyl ether sulfate); nonionic surfactants (for example, a polyoxyethylene alkyl ether, a polyoxyethylene alkyl ester, a polyoxyethylene sorbitan fatty acid ester, a polyoxyethylene alkyl phenyl ether, a polyoxyethylene alkylamine, and a polyoxyethylene alkylamide). They may be used alone or as a mixture of two or more. Further, it is also possible to use acetylene glycol (OLFINE Y and Surfynol 82, 104, 440, 465, and 485 (all the above products being manufactured by Air Products and Chemicals Inc.).

The ratio of the resin as the component constituting the dispersed phase to water is suitably 60 to 400 parts by weight based on 100 parts by weight of the resin with 100 to 200 parts by weight, based on 100 parts by weight of the resin, of water being preferred.

Further, commercially available resin emulsions may also be used, and examples thereof include Microgel E-1002 and E-5002 (styrene/acrylic resin emulsion, manufactured by Nippon Paint Co., Ltd.), Voncoat 4001 (acrylic resin emulsion, manufactured by Dainippon Ink and Chemicals, Inc.), Voncoat 5454 (styrene/acrylic resin emulsion, manufactured by Dainippon Ink and Chemicals, Inc.), SAE- 1014 (styrene/acrylic- resin emulsion, manufactured by Nippon Zeon Co., Ltd.), and Saivinol SK-200 (acrylic resin emulsion, manufactured by Saiden Chemical Industry Co., Ltd).

In the ink used in the present invention, the amount of the resin emulsion incorporated therein is preferably such that the amount of the resin component is in the range of from 0.1 to 40% by weight, more preferably in the range of from 1 to 25% by weight.

The resin emulsion has the effect of inhibiting the penetration of a coloring component and, further, accelerating the fixation on the recording medium by virtue of an interaction between the resin emulsion and the polyvalent metal ions or polyallylamine or polyallylamine derivative. Further, some resin emulsions have an additional effect that they form a film on the recording medium to improve the rubbing resistance of the resultant print.

According to a preferred embodiment of the present invention, the ink composition may contain a thermoplastic resin in the form of a resin emulsion. In this case, the thermoplastic resin has a softening temperature of 50 to 250° C., preferably 60 to 200° C. The term "softening temperature" used herein refers to the lowest temperature among the glass transition temperature of the thermoplastic resin, the melting point of the thermoplastic resin, the temperature which brings the viscosity of the thermoplastic resin to $10^{11}$ to $10^{12}$ poises, the pour point of the thermoplastic resin, and the minimum film forming temperature (MFT) in the form of an emulsion of the thermoplastic resin. In the step of heating according to the method of the present invention, the recording medium is heated to at least the softening temperature of the thermoplastic resin.

Further, preferably, the thermoplastic resin, when heated at the softening or melting temperature or a higher temperature and then cooled, forms a strong film having water resistance and rubbing resistance.

Specific examples of water-insoluble thermoplastic resins include, but not limited to, polyacrylic acid, polymethacrylic acid, an ester of polymethacrylic acid, polyethylacrylic acid, a styrene/butadiene copolymer, polybutadiene, an acrylonitrile/butadiene copolymer, a chloroprene copolymer, a fluororesin, polyvinylidene fluoride, polyolefin resin, cellulose, a styrene/acrylic acid copolymer, a styrene/methacrylic acid copolymer, polystyrene, a styrene/acrylamide copolymer, polyisobutyl acrylate, polyacrylonitrile, polyvinyl acetate, polyvinyl acetal, polyamide, rosin resin, polyethylene, a polycarbonate, a polyvinylidene chloride resin, a cellulosic resin, a vinyl acetate resin, an ethylene/vinyl acetate copolymer, a vinyl acetate/(meth)acrylate copolymer, a vinyl chloride resin, polyurethane, and a rosin ester.

Specific examples of low-molecular weight thermoplastic resins include polyethylene wax, montan wax, alcohol wax, synthetic oxide wax, an α-olefin/maleic anhydride copolymer, animal and vegetable waxes such as carnauba wax, lanolin, paraffin wax, and microcrystalline wax.

Known resin emulsions may be used as the above resin emulsion. For example, resin emulsions described in Japanese Patent Publication No. 1426/1987 and Japanese Patent Laid-Open Nos. 56573/1991, 79678/1991, 160068/1991, and 18462/1992 as such may be used as the resin emulsion in the present invention.

According to a preferred embodiment of the present invention, the ink composition preferably comprises an alginic acid derivative. Preferred examples of alginic acid derivatives include alkali metal salts (for example, sodium salt and potassium salt of alginic acid), organic acid salts (for example, triethanolamine salt) of alginic acid, and ammonium alginate.

The amount of the alginic acid derivative added to the ink composition is preferably about 0.01 to 1% by weight, more preferably about 0.05 to 0.5% by weight.

Although the reason why a good image can be formed by the addition of an alginic acid derivative has not been elucidated yet, it is considered that the polyvalent metal salt present in the reaction solution reacts with the alginic acid derivative in the ink composition to vary the dispersed state of the colorant, promoting the fixation of the colorant onto the recording medium.

The colorant used in the present invention may be any of a dye and a pigment. However, when the penetration of the coloring component in the ink is inhibited by insolubilization or thickening of the ink composition, the use of a pigment dispersed in an aqueous medium is advantageous rather than the use of a dye dissolved in an aqueous medium.

Dyes usable herein include various dyes commonly used in ink jet recording, such as direct dyes, acid dyes, foodstuff dyes, basic dyes, reactive dyes, disperse dyes, vat dyes, soluble vat dyes, and reactive disperse dyes.

Regarding the pigment, inorganic and organic pigments are usable without any particular limitation. Examples of the inorganic pigment include, in addition to titanium oxide and iron oxide, carbon blacks produced by known processes, such as contact, furnace, and thermal processes. Examples of the organic pigment include azo pigments (including azo lake, insoluble azo pigment, condensed azo pigment, and chelate azo pigment), polycyclic pigments (for example, phthalocyanine, perylene, perinone, anthraquinone, quinacridone, dioxazine, thioindigo, isoindolinone, and quinophthalone pigments), dye chelates (for example, basic dye chelates and acid dye chelates), nitro pigments, nitroso pigments, and aniline black.

According to a preferred embodiment of the present invention, the above pigment is preferably added in the form of a pigment dispersion prepared by dispersing the pigment in an aqueous medium with the aid of a dispersant or a surfactant. Preferred dispersants include those commonly used in the preparation of a dispersion of a pigment, for example, polymeric dispersant. In this connection, that the dispersant and the surfactant contained in the dispersion of the pigment function also as the dispersant and the surfactant for the ink composition will be apparent to a person having ordinary skill in the art.

The amount of the pigment added to the ink is preferably about 0.5 to 25% by weight, more preferably about 2 to 15% by weight.

According to a preferred embodiment of the present invention, the ink composition preferably contains an organic solvent. The organic solvent is preferably a low-boiling organic solvent, and preferred examples thereof include methanol, ethanol, n-propyl alcohol, iso-propyl alcohol, n-butanol, sec-butanol, tert-butanol, iso-butanol, and n-pentanol. Monohydric alcohols are particularly preferred. The low-boiling organic solvent has the effect of shortening the time taken for drying the ink.

Further, according to a preferred embodiment of the present invention, the ink composition used in the present invention further comprises a wetting agent comprising a high-boiling organic solvent. Preferred examples of high-boiling organic solvents usable herein include polyhydric alcohols such as ethylene glycol, diethylene glycol, triethylene glycol, polyethylene glycol, polypropylene glycol, propylene glycol, butylene glycol, 1,2,6-hexanetriol, thioglycol, hexylene glycol, glycerin, trimethylolethane, and trimethylolpropane; alkyl ethers of polyhydric alcohols, such as ethylene glycol monomethyl ether, ethylene glycol monobutyl ether, diethylene glycol monomethyl ether, diethylene glycol monoethyl ether, diethylene glycol monobutyl ether, triethylene glycol monomethyl ether, triethylene glycol monoethyl ether, and triethylene glycol monobutyl ether; urea; 2-pyrrolidone; N-methyl-2-pyrrolidone; 1,3-dimethyl-2-imidazolidinone; and triethanolamine.

The amount of the wetting agent added is preferably in the range of from 0.5 to 40% by weight, more preferably in the range of from 2 to 20% by weight, based on the ink. The amount of the low-boiling organic solvent added is preferably 0.5 to 10% by weight, more preferably in the range of from 1.5 to 6% by weight, based on the ink.

The ink composition used in the present invention may contain a dispersant and a surfactant. Examples of surfactants usable herein include various surfactants described above in connection with the resin emulsion.

According to a preferred embodiment of the present invention, the ink composition may contain a saccharide. Examples of saccharides usable herein include monosaccharides, disaccharides, oligosaccharides (including trisaccharides and tetrasaccharides), and other polysaccharides, preferably glucose, mannose, fructose, ribose, xylose, arabinose, galactose, aldonic acid, glucitol, sorbitol, maltose, cellobiose, lactose, sucrose, trehalose, and maltotriose. The term "polysaccharide" used herein refers to saccharides, in a broad sense, including substances which widely exist in the natural world, such as alginic acid, α-cyclodextrin, and cellulose.

Derivatives of these saccharides include reducing sugars of the above saccharides (for example, sugar alcohols represented by the general formula $HOCH_2(CHOH)_nCH_2OH$ wherein n is an integer of 2 to 5), oxidized sugars (for example, aldonic acid and uronic acid), amino acid, and thiosugars. Sugar alcohols are particularly preferred, and specific examples thereof include maltitol and sorbitol.

The content of the above saccharide is suitably in the range of from 0.1 to 40% by weight, preferably 0.5 to 30% by weight, based on the ink.

Further, if necessary, pH adjustors, preservatives, antimolds and the like may be added.

Ink jet recording apparatus

An ink jet recording apparatus for practicing the ink jet recording method according to the present invention will now be described with reference to the accompanying drawings.

FIG. 1 is a diagram showing an embodiment of an ink jet recording apparatus. In this embodiment, an ink composition and a reaction solution are accommodated in a tank and fed into a recording head through an ink tube. Specifically, a recording head 1 is communicated with an ink tank 2 through an ink tube 3. The interior of the ink tank 2 is partitioned, and a chamber for an ink composition, optionally a plurality of chambers respectively for a plurality of color ink compositions, and a chamber for a reaction solution are provided.

The recording head 1 is moved along a carriage 4 by means of a timing belt 6 driven by a motor 5. On the other hand, paper 7 as a recording medium is placed by a platen 8 and a guide 9 at a position facing the recording head 1. In this embodiment, a cap 10 is provided. A suction pump 11 is connected to the cap 10 in order to conduct the so-called "cleaning operation." The ink composition sucked by the pump 11 is reservoired in a waste ink tank 13 through a tube 12.

Figure 2:
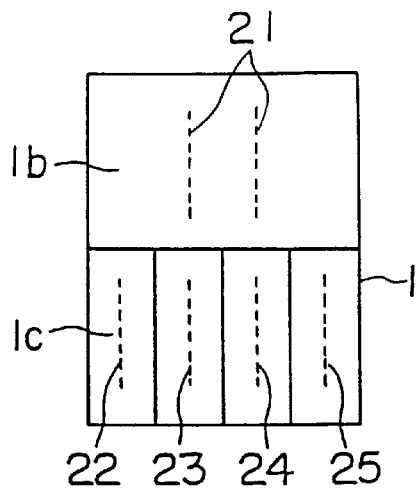
FIG. 2 is an enlarged view showing the surface of nozzles for a recording head, wherein reference character 1b designates the surface of a nozzle for a reaction solution and 1c the surface of a nozzle for an ink composition.

FIG. 2 is an enlarged view showing the surface of nozzles for the recording head 1. In the drawing, the surface of a nozzle for a reaction solution is indicated by 1b, and a nozzle 21 for ejecting the reaction solution is provided in the longitudinal direction. On the other hand, the surface of nozzles for the ink composition is indicated by 1c, and a yellow ink composition, a magenta ink composition, a cyan ink composition, and a black ink composition are ejected respectively through nozzles 22, 23, 24 and 25.

Figure 3:
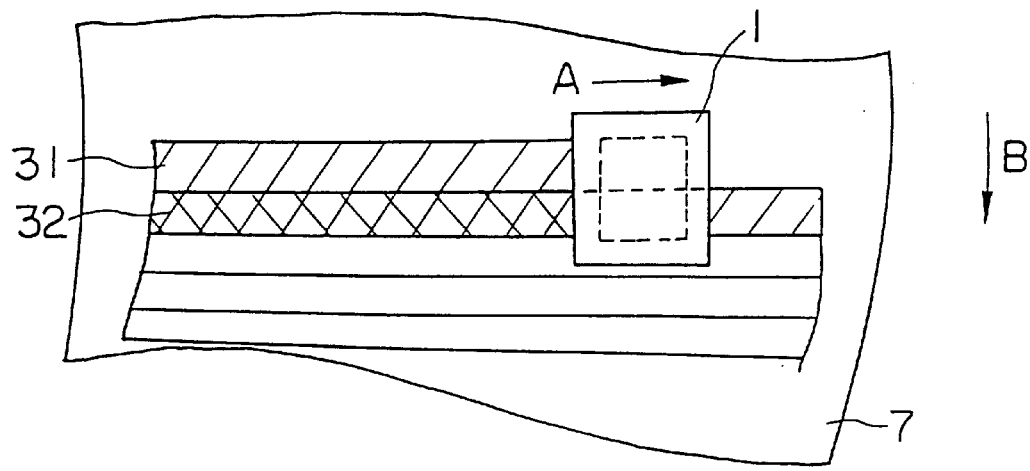
FIG. 3 is a diagram illustrating ink jet recording using the recording head shown in FIG. 2, wherein numeral 31 designates a region where a reaction solution has been deposited and numeral 32 a printed region where an ink composition has been printed on the deposited reaction solution.

Further, an ink jet recording method using the recording head shown in FIG. 2 will be described with reference to FIG. 3. The recording head 1 is moved in the direction indicated by an arrow A, during which time the reaction solution is ejected through the nozzle 21 to form a reaction solution-deposited region 31 in a band form on the recording medium 7. Subsequently, the recording medium 7 is transferred by a predetermined extent in the direction indicated by an arrow B, during which time the recording head 1 is moved the direction opposite to that indicated by the arrow A and returned to the left end of the recording medium 7, and the recording head conduct printing using the ink composition on the reaction solution-deposited region 31, thereby forming a print region 32.

Figure 4:
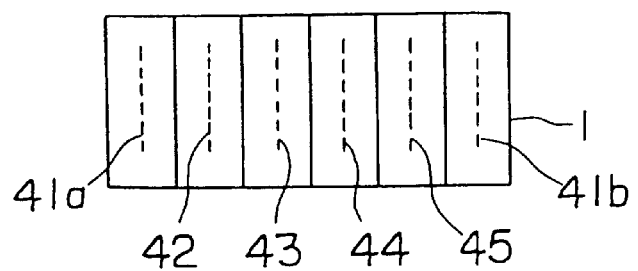
FIG. 4 shows another embodiment of the recording head according to the present invention, wherein all ejection nozzles are arranged in lateral direction.

Further, as shown in FIG. 4, in the recording head 1, it is also possible to arrange all nozzles in the lateral direction to construct a nozzle assembly. In the drawing, ejection nozzles for a reaction solution are denoted by 41a and 41b, and a yellow ink composition, a magenta ink composition, a cyan ink composition, and a black ink composition are ejected respectively through nozzles 42, 43, 44 and 45. In the recording head according to this embodiment, the recording head 1, when reciprocated on the carriage, can conduct printing in both directions. Therefore, in this case, printing at a higher speed is expected as compared with the case where the recording head shown in FIG. 2 is used.

Further, when the reaction solution and the ink composition are preferably adjusted so as to fall within the surface tension ranges described above, a high-quality print can be more stably provided regardless of the order of deposition of the reaction solution and the ink composition. In this case, even the provision of a single ejection nozzle suffices for satisfactory results. For example, in the drawing, the nozzle 41b may be omitted. This can contribute to a further reduction in size of the head and a further increase in printing speed.

Figure 5:
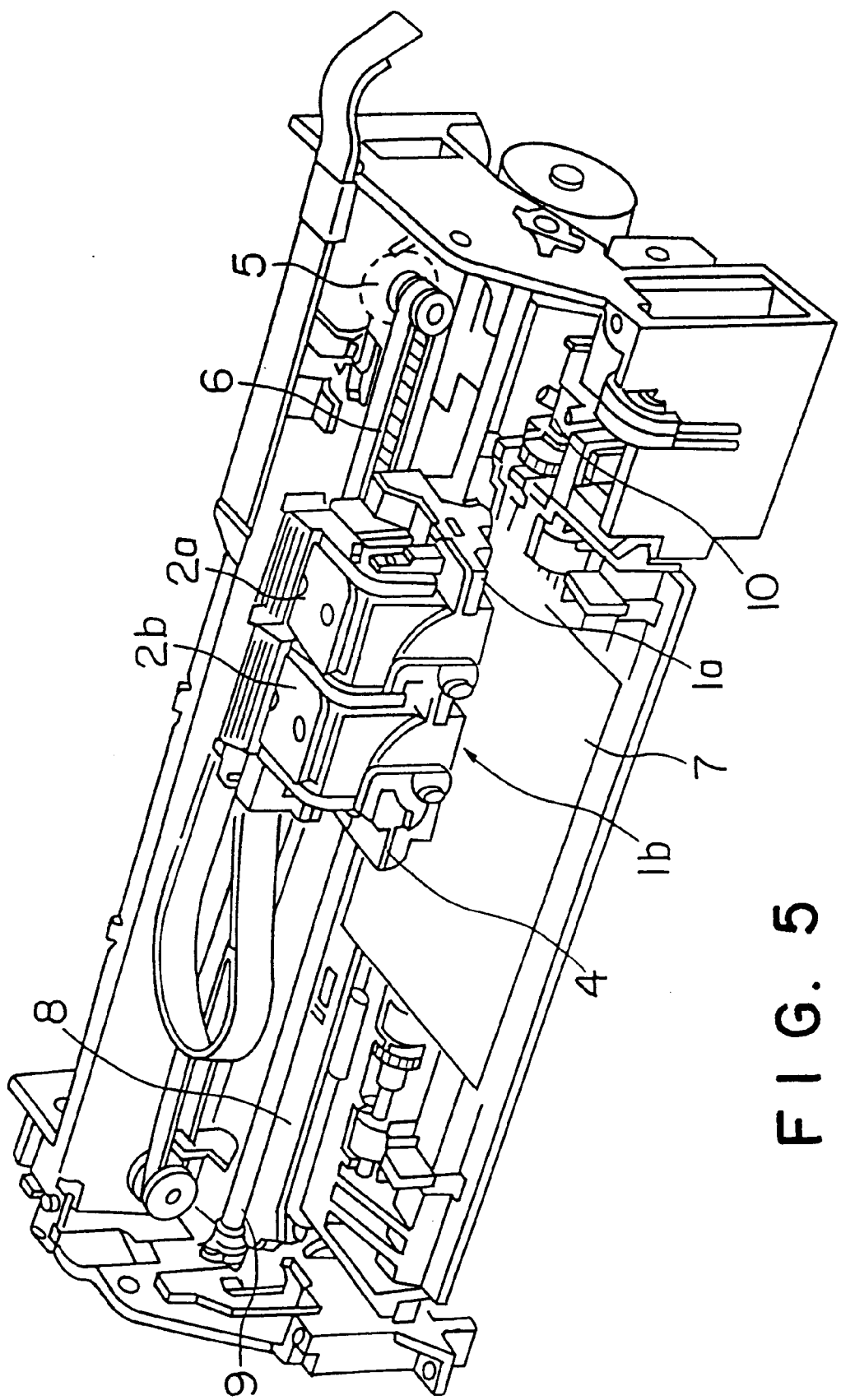
FIG. 5 shows an embodiment of the ink jet recording apparatus according to the present invention, wherein a recording head is integral with an ink tank.

In the ink jet recording apparatus, the supplement of the ink composition may be carried out by replacing an ink tank in a cartridge form. The ink tank may be integral with the recording head. A preferred embodiment of an ink jet recording apparatus using such an ink tank is shown in FIG. 5. In the drawing, the same members as used in the apparatus shown in FIG. 1 have the same reference numerals. In the embodiment shown in FIG. 5, recording heads 1a and 1b are integral respectively with-ink tanks 2a and 2b. An ink composition and a reaction solution are ejected respectively through the recording heads 1a and 1b. Basically, printing may be conducted in the same manner as described above in connection with the apparatus shown in FIG. 1. Further, in this embodiment, the recording head 1a is moved together with the ink tank 2a on a carriage 4, while the recording head 1a is moved together with the ink tank 2b on the carriage 4.

Figure 6:
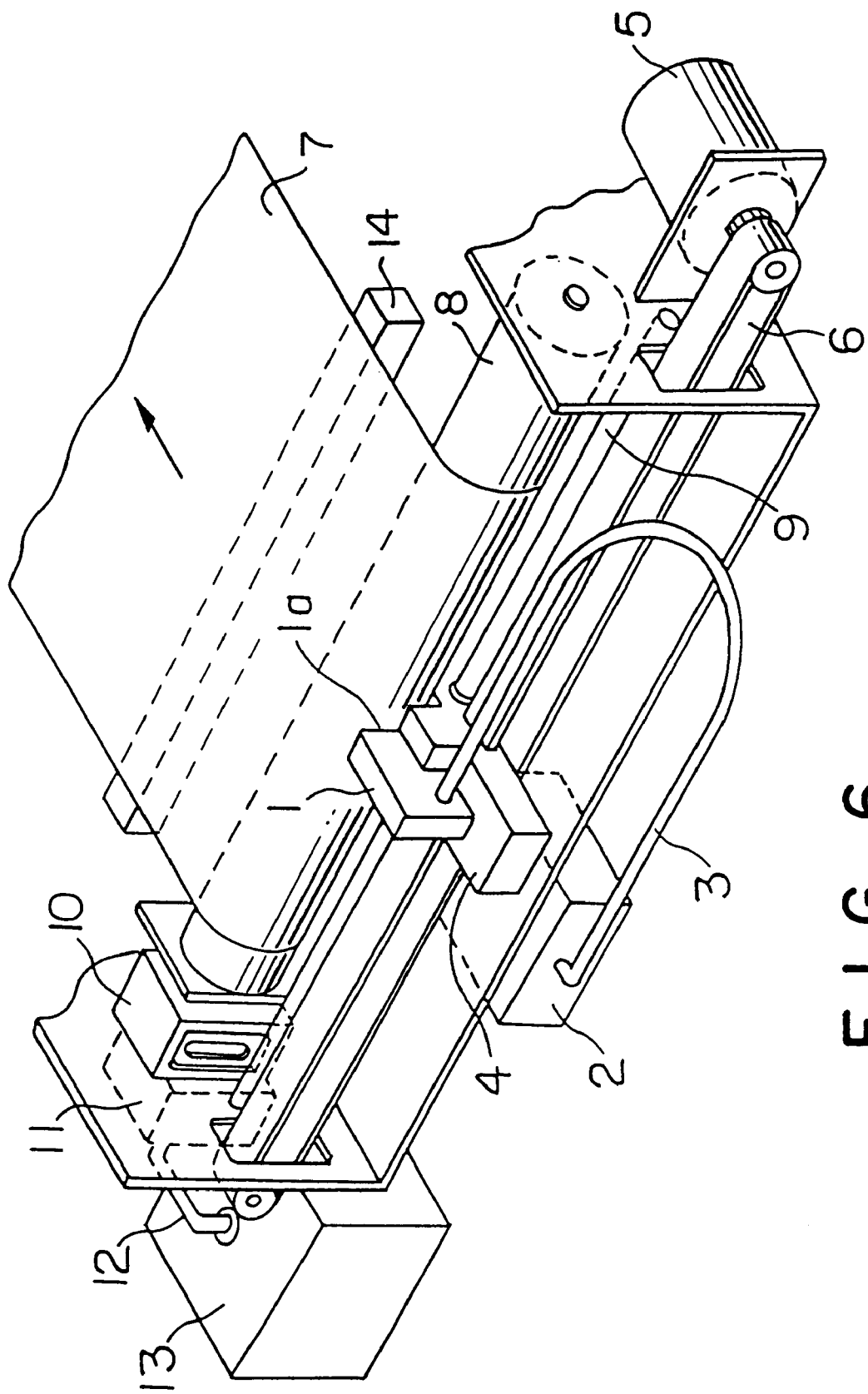
FIG. 6 shows another embodiment of the ink jet recording apparatus according to the present invention, wherein a heater is provided to heat a recording medium after printing.

A preferred embodiment of an ink jet recording apparatus wherein a heater for heating a printed recording medium is further provided is shown in FIG. 6. The embodiment shown in FIG. 6 is the same as the embodiment shown in FIG. 1, except that a heater 14 is additionally provided. The heater 14 may be of a contact type, wherein, in heating the recording medium, it is brought into contact with the recording medium. Alternatively, the heating means may be of a non-contact type where the recording medium is heated by applying infrared rays or the like or blowing hot air to the recording medium.

The reaction solution may be deposited onto the recording medium by any of an embodiment where the reaction solution is selectively deposited on only an area where the ink composition is to be deposited and an embodiment where the reaction solution is deposited on the whole surface of paper. The former embodiment can minimize the consumption of the reaction solution and, hence, is cost-effective. In this embodiment, however, an accuracy is required to some extent with respect to the position where both the reaction solution and the ink composition are deposited. On the other hand, for the latter embodiment, the requirement for the accuracy of the position where the reaction solution and the ink composition are deposited is relaxed as compared with the former embodiment. In this embodiment, however, since the reaction solution is deposited in a large amount on the whole surface of paper, the paper is likely to cause curling during drying. For the above reason, the selection of the embodiment may be determined by taking a combination of the ink composition with the reaction solution into consideration. In the case of the former embodiment, the deposition of the reaction solution can be performed by ink jet recording.

Further, according to a preferred embodiment of the present invention, the ink jet recording apparatus is preferably such that it can accommodate the reaction solution and the ink composition and, regarding the amounts of the ink composition and the reaction solution, the ink composition is used up earlier than the reaction solution.

Furthermore, according to a preferred embodiment of the present invention, an ink tank for use in the ink jet recording apparatus is provided. The ink tank may be of either a replaceable cartridge type or a type where it is integral with the recording head. In any case, the ink tank is preferably such that it can accommodate the reaction solution and the ink composition and, regarding the amounts of the ink composition and the reaction solution, the ink composition is used up earlier than the reaction solution.

In this connection, it should be noted that when the reaction solution is used up earlier than the ink composition, it is difficult to learn when the reaction solution has been used up because the reaction solution is usually transparent. That is, in this case, that the reaction solution has been used up cannot be learned until the user observes the print and notices a deterioration in print quality, making it necessary for the user to always observe the print quality.

In the ink jet recording apparatus according to the above embodiment, since the ink composition per se is usually in a colored state, it is possible to learn when the ink composition has been used up. Further, since there is no possibility that the reaction solution is used up earlier than the ink composition, ink jet recording wherein two liquids are printed can be stably conducted. The provision of sensor means or the like on the tank section for accommodating the ink composition and the reaction solution is considered effective for observing the consumption of the liquids. In this case, however, the mechanism is complicated. In this sense, the above embodiment is advantageous because the use of a simple mechanism suffices for the contemplated purposes.

In the above embodiment, when a plurality of ink compositions are used, the expression "the ink composition is used up earlier than the reaction solution" does not necessarily mean that part of the reaction solution should remain in the tank when all the plurality of ink compositions have been used up so far as part of the reaction solution remains in the tank when any one of the ink compositions has been used up. However, it is preferred that part of the reaction solution remains in the tank when all the plurality of ink compositions have been used up.

EXAMPLES

The present invention will now be described in more detail with reference to the following examples, though it is not limited to these examples only.

Example A

| Black ink A-1 | |
|---|---|
| Carbon black MA7 (manufactured by Mitsubishi Kasei Corp.) | 5% by weight |
| Styrene/acrylic acid copolymer (dispersant) | 1% by weight |
| Voncoat 4001 (acrylic resin emulsion, resin component: 50%, MFT = 5° C., manufactured by Dainippon Ink and Chemicals, Inc.) | 50% by weight |
| Sucrose | 0.7% by weight |
| Maltitol | 6.3% by weight |
| Glycerin | 10% by weight |
| 2-Pyrrolidone | 2% by weight |
| Ethanol | 4% by weight |
| Pure water | Balance |

Carbon black and the dispersant were mixed together and dispersed by means of a sand mill (manufactured by Yasukawa Seisakusho) with glass beads (diameter: 1.7 mm, amount: 1.5 times, by weight, the amount of the mixture) for 2 hr. Thereafter, the glass beads were removed, and the remaining additives were added, and the mixture was stirred at room temperature for 20 min and then filtered through a 5-$\mu$m membrane filter to prepare an ink for ink jet recording.

| Black ink A-2 | |
|---|---|
| Carbon black Raven 1080 (manufactured by Columbian Carbon) | 5% by weight |
| Styrene/acrylic acid copolymer (dispersant) | 1% by weight |
| Microgel E-5002 (styrene/acrylic emulsion, resin component: 29.2%, MFT = about 80° C., manufactured by Nippon Paint Co., Ltd.) | 0.35% by weight |
| Sucrose | 0.7% by weight |
| Maltitol | 6.3% by weight |
| Glycerin | 10% by weight |
| 2-Pyrrolidone | 2% by weight |
| Ethanol | 4% by weight |
| Pure water | Balance |

| Black ink A-3 | |
|---|---|
| Carbon black Raven 1080 | 5% by weight |
| Styrene/acrylic acid copolymer (dispersant) | 1% by weight |
| Microgel E-5002 (resin component: 29.2%) | 3.5% by weight |
| Sucrose | 0.7% by weight |
| Maltitol | 6.3% by weight |
| Glycerin | 10% by weight |
| 2-Pyrrolidone | 2% by weight |
| Ethanol | 4% by weight |
| Pure water | Balance |

| Black ink A-4 | |
|---|---|
| C.I. Food Black | 2% by weight |
| Voncoat 4001 (resin component: 50%) | 6% by weight |
| 2-Pyrrolidone | 5% by weight |
| Pure water | Balance |

| Black ink A-5 | |
|---|---|
| C.I. Food Black | 2% by weight |
| 2-Pyrrolidone | 5% by weight |
| Pure water | Balance |

| Black ink A-6 | |
|---|---|
| Carbon black Raven 1080 | 5% by weight |
| Styrene/acrylic acid copolymer (dispersant) | 1% by weight |

-continued

| | |
|---|---|
| Sucrose | 0.7% by weight |
| Maltitol | 6.3% by weight |
| Glycerin | 10% by weight |
| 2-Pyrrolidone | 2% by weight |
| Ethanol | 4% by weight |
| Pure water | Balance |

Color ink A-1
Dye

| | |
|---|---|
| Cyan ink | 3% by weight |
| C.I. Direct Blue 86 | |
| Magenta ink | 3% by weight |
| C.I. Direct Red 9 | |
| Yellow ink | 3% by weight |
| C.I. Acid Yellow 23 | |

Liquid medium

| | |
|---|---|
| Voncoat 4001 (resin component: 50%) | 2% by weight |
| Diethylene glycol | 10% by weight |
| Surfynol 82 | 3% by weight |
| Surfynol TG | 0.5% by weight |
| Pure water | Balance |

Color ink A-2
Pigment

| | |
|---|---|
| Cyan ink | 2% by weight |
| Pigment KETBLUEEX-1 | |
| (manufactured by Dainippon Ink and Chemicals, Inc.) | |
| Magenta ink | 2% by weight |
| Pigment KETRED 309 | |
| Yellow ink | 2% by weight |
| Pigment KETYELLOW 403 | |
| (manufactured by Dainippon Ink and Chemicals, Inc.) | |

Liquid medium

| | |
|---|---|
| Styrene/acrylic acid copolymer (dispersant) | 0.4% by weight |
| Voncoat 4001 (resin component: 50%) | 2% by weight |
| Sucrose | 0.7% by weight |
| Maltitol | 6.3% by weight |
| Glycerin | 10% by weight |
| 2-Pyrrolidone | 2% by weight |
| Ethanol | 4% by weight |
| Pure water | Balance |

Reaction solution A-1

| | |
|---|---|
| Magnesium acetate tetrahydrate | 0.5% by weight |
| Diethylene glycol | 10% by weight |
| Pure water | Balance |

Reaction solution A-2

| | |
|---|---|
| Calcium chloride anhydride | 10% by weight |
| Diethylene glycol | 10% by weight |
| Pure water | Balance |

Reaction solution A-3
Dye

| | |
|---|---|
| Cyan ink | 3% by weight |
| C.I. Direct Blue 86 | |
| Magenta ink | 3% by weight |
| C.I. Direct Red 9 | |
| Yellow ink | 3% by weight |
| C.I. Acid Yellow 23 | |

Liquid medium

| | |
|---|---|
| Calcium chloride anhydride | 10% by weight |
| Glycerin | 10% by weight |
| Pure water | Balance |

The above ink compositions were used in combination with the above reaction solutions to actually conduct printing by means of an ink jet printer. The resultant prints were then evaluated for the quality and the like.

Evaluation Tests on Print
Evaluation A-1:
Print Quality
(Feathering or Bleeding)

Printing was carried out on the following various papers using an ink jet printer MJ-700V2C (manufactured by Seiko Epson Corporation). In the pri nting, the reaction solution was first printed (100% duty), and the black ink was then used to print a letter. The printing was carried out at a density of 360 dpi (dot/in.) with the amount of the ink ejected per dot being 0.05 to 0.07 pg. After drying, the prints were inspected for feathering in the letter.
(1) Xerox P Paper (Xerox Corp.)
(2) Ricopy 6200 Paper (Ricoh Co. Ltd.)
(3) Xerox 4024 Paper (Xerox Corp.)
(4) Nee nah Bond Paper (Kimberly-Clark)
(5) Xerox R Pa per (Xerox Corp., recycled paper)
(6) Yamayuri (Honshu Paper Co., Ltd., recycled paper)

The results w ere as t abulated in Table 1. Regarding the results given In the table, the evaluation criteria are as follows.
○: Sharp print without any feathering,
Δ: Feather ing observed, and
x: Remarkable feathering to render the outline of the letter blurry.

Evaluation A-2:
Print Wuality (OD)

The reflection optical density (OD) of the prints prepared in the above test on the print quality (feathering) was measured with Macbeth PCMII (manufactured by Macbeth). The results were as tabulated in Table 1.

Evaluation A-3:
Unevenness of Printing

Printing was carried out on the following various papers using an ink jet printer MJ-70yV2C. The printing method was the same as described above in connection with the evaluation of the print quality (feathering).
(1) Ricopy 6200 Paper (Ricoh Co. Ltd.)
(2) Canon dry Paper (Canon Inc.)

The OD of randomly selected five points in the print area was measured with Macbeth PCMII, and the average of the measured values was determined. This procedure was repeated five times, and the maximum value and the minimum value in the five average values were determined. When the difference between the maximum value and the minimum value is less than 0.4, there is no problem for practical use with the difference being preferably less than 0.3. The results were as tabulated in Table 1. In the results given in the table, the evaluation criteria were as follows.
○: OD difference of less than 0.3,
Δ: OD difference of 0.3 to less than 0.4, and
x: OD difference of not less than 0.4.

Evaluation A-4:
Rubbing Property

Printing was carried out on Xerox P paper (manufactured by Xerox Corp.) by means of an ink jet printer MJ-700V2C, and the resultant prints were air-dried for 24 hr. The prints were rubbed with a finger under an environment of 25° C. and 50% RH and then observed by visible inspection for the presence of a stain on the print. The results were as tabulated in Table 1. In the table, the evaluation criteria were as follows.
○: No stain observed in the print,
Δ: Slight stain observed in the print with the letter being still legible, and
x: Stain observed in the print rendering the letter illegible.

Evaluation A-5:
Color Bleeding

An ink jet printer MJ-700V2C was used in this evaluation test. The reaction solution was deposited (100% duty) on the following various papers as a recording paper, and color inks (cyan, magenta, and yellow) (100% duty) and the black ink (a letter) were simultaneously printed to examine the prints for the presence of uneven color-to-color mixing in the letter boundaries. In this case, in Example A-7, since the reaction solution is a color ink, the reaction solution (100% duty) and the black ink (a letter) were simultaneously printed.

(1) Xerox P Paper (Xerox Corp.)
(2) Ricopy 6200 Paper (Ricoh Co. Ltd.)
(3) Xerox 4024 Paper (Xerox Corp.)
(4) Neenah Bond Paper (Kimberly-Clark)
(5) Xerox R Paper (Xerox Corp., recycled paper)
(6) Yamayuri (Honshu Paper Co., Ltd., recycled paper)

The results were as tabulated in Table 1. In the table, the evaluation criteria were as follows.

- ○: No color-to-color mixing observed with clear letter boundaries,
- Δ: Feather-like color-to-color mixing observed, and
- x: Significant color-to-color mixing observed rendering the outline of the letter blurry.

TABLE 1

|  | Black ink | Color ink | Reaction solution | Evaluation 1: Feathering | Evaluation 2: OD | Evaluation 3: Unevenness of printing | Evaluation 4: Rubbing resistance | Evaluation 5: Color bleeding |
|---|---|---|---|---|---|---|---|---|
| Example A-1 | A-1 | — | A-1 | ○ | 1.40 | ○ | ○ | — |
| Example A-2 | A-2 | — | A-2 | Δ | 1.38 | ○ | ○ | — |
| Example A-3 | A-3 | — | A-2 | ○ | 1.42 | ○ | ○ | — |
| Example A-4 | A-4 | — | A-2 | Δ | 1.33 | ○ | ○ | — |
| Example A-5 | A-1 | A-1 | A-2 | ○ | 1.44 | ○ | ○ | Δ |
| Example A-6 | A-1 | A-2 | A-2 | ○ | 1.44 | ○ | ○ | ○ |
| Example A-7 | A-1 | — | A-3 | ○ | 1.43 | ○ | ○ | Δ |
| Comparative Example A-1 | A-5 | — | A-2 | X | 1.26 | Δ | Δ | — |
| Comparative Example A-2 | A-6 | — | A-2 | Δ | 1.32 | X | X | — |
| Comparative Example A-3 | A-1 | — | Pure water | X | 1.20 | Δ | Δ | — |
| Comparative Example A-4 | A-1 | A-2 | — | Δ | 1.33 | X | ○ | X |

Example B
Inks were prepared in the same manner as described above in black ink A-1.

Black ink B-1

| Carbon black Raven 1080 | 5% by weight |
| Styrene/acrylic acid copolymer (dispersant) | 1% by weight |
| Microgel E-5002 (styrene/acrylic resin emulsion, resin component: 29.2%, MFT = about 80° C., manufactured by Nippon Paint Co., Ltd.) | 3.5% by weight |
| Sucrose | 0.7% by weight |
| Maltitol | 6.3% by weight |
| Glycerin | 10% by weight |
| 2-Pyrrolidone | 2% by weight |
| Ethanol | 4% by weight |
| Pure water | Balance |

Example B
Inks were prepared in the same manner as described above in black ink A-1.

Black ink B-2

| C.I. Food Black | 2% by weight |
| Voncoat 4001 (acrylic resin emulsion, resin component: 50%, MFT = 5° C., manufactured by Dainippon Ink and Chemicals, Inc.) | 6% by weight |
| 2-Pyrrolidone | 5% by weight |
| Pure water | Balance |

Black ink B-3

| Carbon black Raven 1080 | 5% by weight |
| Styrene/acrylic acid copolymer (dispersant) | 1% by weight |
| Sucrose | 0.7% by weight |
| Maltitol | 6.3% by weight |
| Glycerin | 10% by weight |
| 2-Pyrrolidone | 2% by weight |
| Ethanol | 4% by weight |
| Pure water | Balance |

Example B
Inks were prepared in the same manner as described above in black ink A-1.

Color ink B-1
Pigment

| Cyan ink Pigment KETBLUEEX-1 (manufactured by Dainippon Ink and Chemicals, Inc.) | 2% by weight |
| Magenta ink Pigment KETRED 309 (manufactured by Dainippon Ink and Chemicals, Inc.) | 2% by weight |
| Yellow ink Pigment KETYELLOW 403 (manufactured by Dainippon Ink and Chemicals, Inc.) | 2% by weight |

Example B
Inks were prepared in the same manner as described above in black ink A-1.

Liquid medium

| | |
|---|---|
| Styrene/acrylic acid copolymer (dispersant) | 0.4% by weight |
| Voncoat 4001 (resin component: 50%) | 2% by weight |
| Sucrose | 0.7% by weight |
| Maltitol | 6.3% by weight |
| Glycerin | 10% by weight |
| 2-Pyrrolidone | 2% by weight |
| Ethanol | 4% by weight |
| Pure water | Balance |

Reaction solution B-1

| | |
|---|---|
| Magnesium acetate tetrahydrate | 2% by weight |
| Surfynol 104 (manufactured by Air Products and Chemicals Inc.) | 0.1% by weight |
| Diethylene glycol | 10% by weight |
| Pure water | Balance |

Reaction solution B-2

| | |
|---|---|
| Calcium chloride anhydride | 2% by weight |
| Diethylene glycol monobutyl ether | 20% by weight |
| Diethylene glycol | 10% by weight |
| Pure water | Balance |

Reaction solution B-3

| | |
|---|---|
| Calcium chloride anhydride | 5% by weight |
| Glycerin | 10% by weight |
| Pure water | Balance |

Reaction solution B-4
Dye

| | |
|---|---|
| Cyan ink C.I. Direct Blue 86 | 3% by weight |
| Magenta ink C.I. Direct Red 9 | 3% by weight |
| Yellow ink C.I. Acid Yellow 23 | 3% by weight |

Liquid medium

| | |
|---|---|
| Calcium chloride anhydride | 5% by weight |
| Triethylene glycol monobutyl ether | 10% by weight |
| Surfynol 465 | 1% by weight |
| Glycerin | 10% by weight |
| Pure water | Balance |

The above ink compositions were used in combination with the above reaction solutions to actually conduct printing by means of an ink jet printer. The resultant prints were then evaluated.

Evaluation Tests on Print

Evaluation B-1:

Print Quality (Feathering)

The evaluation was performed in the same manner as described above in Evaluation A-1.

Evaluation B-2:

Print Quality (OD)

The evaluation was performed in the same manner as described above in Evaluation A-2.

Evaluation B-3:

Unevenness of Printing

The evaluation was performed in the same manner as described above in Evaluation A-3, except that the evaluation criteria were as follows.

⊚: OD difference of less than 0.2,

○: OD difference of 0.2 to less than 0.3, and

Δ: OD difference of not less than 0.3.

Evaluation B-4:

Rubbing Property

The evaluation was performed in the same manner as described above in Evaluation A-4.

Evaluation B-5:

Color Bleeding

The evaluation was performed in the same manner as described above in Evaluation A-5.

TABLE 2

| | Black ink | Color ink | Reaction solution | Evaluation 1: Feathering | Evaluation 2: OD | Evaluation 3: Unevenness of printing | Evaluation 4: Rubbing resistance | Evaluation 5: Color bleeding |
|---|---|---|---|---|---|---|---|---|
| Example B-1 | B-1 | — | B-1 | ○ | 1.42 | ⊚ | ○ | — |
| Example B-2 | B-1 | — | B-2 | ○ | 1.42 | ⊚ | ○ | — |
| Example B-3 | B-1 | — | B-3 | ○ | 1.42 | ○ | ○ | — |
| Example B-4 | B-2 | — | B-2 | Δ | 1.33 | ⊚ | ( | — |
| Example B-5 | B-1 | B-1 | B-2 | ○ | 1.42 | ⊚ | ○ | ○ |
| Example B-6 | B-1 | — | B-4 | ○ | 1.42 | ⊚ | ○ | ○ |
| Comparative Example B-1 | B-3 | — | B-2 | Δ | 1.32 | Δ | X | — |
| Comparative Example B-2 | B-1 | B-1 | — | Δ | 1.33 | Δ | ○ | — |

Example C

Inks were prepared in the same manner as described above in black ink A-1.

| Black ink C-1 | |
| --- | --- |
| Carbon black MA7 (manufactured by Mitsubishi Kasei Corp.) | 5% by weight |
| Styrene/acrylic acid copolymer (dispersant) | 1% by weight |
| Voncoat 4001 (acrylic resin emulsion, resin component: 50%, MFT = 5° C., manufactured by Dainippon Ink and Chemicals, Inc.) | 50% by weight |
| Sucrose | 0.7% by weight |
| Maltitol | 6.3% by weight |
| Glycerin | 10% by weight |
| 2-Pyrrolidone | 2% by weight |
| Ethanol | 4% by weight |
| Pure water | Balance |
| Black ink C-2 | |
| Carbon black Raven 1080 (manufactured by Columbian Carbon) | 5% by weight |
| Styrene/acrylic acid copolymer (dispersant) | 1% by weight |
| Microgel E-5002 (styrene/acrylic emulsion, resin component: 29.2%, MFT = about 80° C., manufactured by Nippon Paint Co., Ltd.) | 0.35% by weight |
| Sucrose | 0.7% by weight |
| Maltitol | 6.3% by weight |
| Glycerin | 10% by weight |
| 2-Pyrrolidone | 2% by weight |
| Ethanol | 4% by weight |
| Pure water | Balance |
| Black ink C-3 | |
| Carbon black Raven 1080 | 5% by weight |
| Styrene/acrylic acid copolymer (dispersant) | 1% by weight |
| Microgel E-5002 | 3.5% by weight |
| Sucrose | 0.7% by weight |
| Maltitol | 6.3% by weight |
| Glycerin | 10% by weight |
| 2-Pyrrolidone | 2% by weight |
| Ethanol | 4% by weight |
| Pure water | Balance |
| Black ink C-4 | |
| C.I. Food Black | 2% by weight |
| Voncoat 4001 | 6% by weight |
| 2-Pyrrolidone | 5% by weight |
| Pure water | Balance |
| Black ink C-5 | |
| C.I. Food Black | 2% by weight |
| 2-Pyrrolidone | 5% by weight |
| Pure water | Balance |
| Black ink C-6 | |
| Carbon black Raven 1080 | 5% by weight |
| Styrene/acrylic acid copolymer (dispersant) | 1% by weight |
| Sucrose | 0.7% by weight |
| Maltitol | 6.3% by weight |
| Glycerin | 10% by weight |
| 2-Pyrrolidone | 2% by weight |
| Ethanol | 4% by weight |
| Pure water | Balance |
| Color ink C-1 | |
| Dye | |
| Cyan ink C.I. Direct Blue 86 | 3% by weight |
| Magenta ink C.I. Direct Red 9 | 3% by weight |
| Yellow ink C.I. Acid Yellow 23 | 3% by weight |
| Liquid medium | |
| Voncoat 4001 (resin component: 50%) | 2% by weight |
| Diethylene glycol | 10% by weight |
| Surfynol 82 | 3% by weight |
| Surfynol TG | 0.5% by weight |
| Pure water | Balance |
| Color ink C-2 | |
| Pigment | |
| Cyan ink Pigment KETBLUEEX-1 (manufactured by Dainippon Ink and Chemicals, Inc.) | 2% by weight |
| Magenta ink Pigment KETRED309 (manufactured by Dainippon Ink and Chemicals, Inc.) | 2% by weight |
| Yellow ink Pigment KETYELLOW403 (manufactured by Dainippon Ink and Chemicals, Inc.) | 2% by weight |
| Liquid medium | |
| Styrene/acrylic acid copolymer (dispersant) | 0.4% by weight |
| Voncoat 4001 (resin component: 50%) | 2% by weight |
| Sucrose | 0.7% by weight |
| Maltitol | 6.3% by weight |
| Glycerin | 10% by weight |
| 2-Pyrrolidone | 2% by weight |
| Ethanol | 4% by weight |
| Pure water | Balance |
| Reaction solution C-1 | |
| Polyallylamine PAA-CH$_3$COOH-L (resin component: 25%, manufactured by Nitto Boseki Co., Ltd) | 2% by weight |
| Diethylene glycol | 10% by weight |
| Pure water | Balance |
| Reaction solution C-2 | |
| Polyallylamine PAA-HCl-3L (resin component: 50%, manufactured by Nitto Boseki Co., Ltd) | 20% by weight |
| Diethylene glycol | 10% by weight |
| Pure water | Balance |
| Reaction solution C-3 | |
| Dye | |
| Cyan ink C.I. Direct Blue 86 | 3% by weight |
| Magenta ink C.I. Direct Red 9 | 3% by weight |
| Yellow ink C.I. Acid Yellow 23 | 3% by weight |
| Liquid medium | |
| Polyallylamine PAA-10C (resin component: 10%, manufactured by Nitto Boseki Co., Ltd) | 30% by weight |
| Glycerin | 10% by weight |
| Pure water | Balance |

The above ink compositions were used in combination with the above reaction solutions to actually conduct printing by means of an ink jet printer. The resultant prints were then evaluated for the print quality and the like.

Evaluation Tests on Print

Evaluation C-1:

Print Quality (Feathering)

The evaluation was performed in the same manner as described above in Evaluation A-1.

Evaluation C-2:

Print Quality (OD)

The evaluation was performed in the same manner as described above in Evaluation A-2.

Evaluation C-3:
Unevenness of Printing

The evaluation was performed in the same manner as described above in Evaluation A-3.

Evaluation C-4:
Rubbing Property

The evaluation was performed in the same manner as described above in Evaluation A-4.

Evaluation C-5:
Color Bleeding

The evaluation was performed in the same manner as described above in Evaluation A-5.

| Glycerin | 10% by weight |
| Sodium alginate | 0.2% by weight |
| Ion-exchanged water | Balance |
| Black ink D-3 | |
| | |
| Carbon black MA 100 | 8% by weight |
| (manufactured by Mitsubishi Kasei Corp.) | |
| Styrene/acrylic acid copolymer | 5% by weight |
| ammonium salt | |
| (molecular weight: 7,000, | |
| resin component: 38%; dispersant) | |

TABLE 3

| | Black ink | Color ink | Reaction solution | Evaluation 1: Feathering | Evaluation 2: OD | Evaluation 3: Unevenness of printing | Evaluation 4: Rubbing resistance | Evaluation 5: Color bleeding |
|---|---|---|---|---|---|---|---|---|
| Example C-1 | C-1 | — | C-1 | ○ | 1.46 | ○ | ○ | — |
| Example C-2 | C-2 | — | C-2 | Δ | 1.36 | ○ | ○ | — |
| Example C-3 | C-3 | — | C-2 | ○ | 1.42 | ○ | ○ | — |
| Example C-4 | C-4 | — | C-2 | Δ | 1.32 | ○ | ○ | — |
| Example C-5 | C-1 | C-1 | C-2 | ○ | 1.44 | ○ | ○ | Δ |
| Example C-6 | C-1 | C-2 | C-2 | ○ | 1.45 | ○ | ○ | ○ |
| Example C-7 | C-1 | — | C-3 | ○ | 1.43 | ○ | ○ | Δ |
| Comparative Example C-1 | C-5 | — | C-2 | X | 1.26 | Δ | Δ | — |
| Comparative Example C-2 | C-6 | — | C-2 | Δ | 1.30 | X | X | — |
| Comparative Example C-3 | C-1 | C-2 | — | Δ | 1.33 | X | X | X |

Example D

Inks were prepared in the same manner as described above in black ink A-1.

Black ink D-1

| Carbon black MA7 | 5% by weight |
| (manufactured by | |
| Mitsubishi Kasei Corp.) | |
| Styrene/acrylic acid copolymer | 3% by weight |
| ammonium salt | |
| (molecular weight: 7,000, | |
| resin component: 38%; dispersant) | |
| Grandoll pp-1000 | 7% by weight |
| (manufactured by Dainippon Ink | |
| and Chemicals, Inc., styrene/acrylic | |
| resin emulsion, resin component: 45%) | |
| Maltitol | 7% by weight |
| Glycerin | 10% by weight |
| 2-Pyrrolidone | 2% by weight |
| DUCK ALGIN NSPLL | 0.1% by weight |
| (sodium alginate manufactured by | |
| KIBUN FOODCHEMIFA CO., LTD.) | |
| Ion-exchanged water | Balance |
| Black ink D-2 | |
| | |
| Carbon black Raven 1080 | 5% by weight |
| (manufactured by Columbian Carbon) | |
| Styrene/acrylic acid copolymer | 3% by weight |
| ammonium salt (molecular weight: 7,000, | |
| resin component: 38%; dispersant) | |
| Voncoat 5454 | 5% by weight |
| (manufactured by Dainippon Ink | |
| and Chemicals, Inc., styrene/acrylic | |
| resin emulsion, resin component: 45%) | |
| Sucrose | 10% by weight |
| SG-60 | 8% by weight |
| (manufactured by Gifu Shellac | |
| Manufacturing Co., Ltd, styrene/acrylic | |
| resin emulsion, resin component: 41%) | |
| Sucrose | 5% by weight |
| Glycerin | 10% by weight |
| Sodium alginate | 0.05% by weight |
| Diethylene glycol | 5% by weight |
| Ion-exchanged water | Balance |
| Black ink D-4 | |
| | |
| Carbon black MA7 | 5% by weight |
| (manufactured by Mitsubishi Kasei Corp.) | |
| Styrene/acrylic acid copolymer | 3% by weight |
| ammonium salt (molecular weight: 7,000, | |
| resin component: 38%; dispersant) | |
| Grandoll PP-1000 | 7% by weight |
| (manufactured by Dainippon Ink | |
| and Chemicals, Inc., styrene/acrylic | |
| resin emulsion, resin component: 45%) | |
| Maltitol | 7% by weight |
| Glycerin | 10% by weight |
| 2-Pyrrolidone | 2% by weight |
| Ion-exchanged water | Balance |

Color ink D-1

A cyan ink composition, a magenta ink composition, and a yellow ink composition were prepared from the following colorants and liquid medium. A combination of these color ink compositions are designated as "color ink D-1."

| Cyan ink | 2% by weight |
|---|---|
| Pigment KETBLUEX-1 | |
| (manufactured by Dainippon Ink | |
| and Chemicals, Inc.) | |
| Magenta ink | 2% by weight |
| Pigment KETRED 309 | |
| (manufactured by Dainippon Ink | |
| and Chemicals, Inc.) | |
| Yellow ink | 2% by weight |
| Pigment KETYELLOW 403 | |
| (manufactured by Dainippon Ink | |
| and Chemicals, Inc.) | |
| Liquid medium | |
| Styrene/acrylic acid copolymer | 1.5% by weight |
| ammonium salt (molecular weight: 7,000, | |
| resin component: 38%; dispersant) | |
| Grandoll PP-1000 | 7% by weight |
| (manufactured by Dainippon Ink | |
| and Chemicals, Inc., styrene/acrylic | |
| resin emulsion, resin component: 45%) | |
| Maltitol | 7% by weight |
| Glycerin | 10% by weight |
| 2-Pyrrolidone | 2% by weight |
| Sodium alginate | 0.1% by weight |
| Ion-exchanged water | Balance |

Color ink D-2

An cyan ink composition, a magenta ink composition, and a yellow ink composition were prepared from the following colorants and liquid medium. A combination of these color ink compositions are designated as "color ink D-2."

| Cyan ink | 2% by weight |
|---|---|
| Copper phthalocyanine | |
| Magenta ink | 3% by weight |
| C.I. Pigment Red 122 | |
| Yellow ink | 2% by weight |
| C.I. Pigment Yellow 17 | |
| Liquid medium | |
| Styrene/acrylic acid copolymer | 1.5% by weight |
| ammonium salt | |
| (molecular weight: 7,000, resin | |
| component: 38%; dispersant) | |
| Voncoat 5454 | 5% by weight |
| (manufactured by Dainippon Ink | |
| and Chemicals, Inc., styrene/acrylic | |
| resin emulsion, resin component: 45%) | |
| Sucrose | 10% by weight |
| Glycerin | 10% by weight |
| Sodium alginate | 0.2% by weight |
| Ion-exchanged water | Balance |

Color ink D-3

An ink composition was prepared in the same manner as described above in connection with the preparation of the color ink D-2, except that sodium alginate was not used. The resultant ink composition was designated as "color ink D-3."

| Reaction solution D-1 | |
|---|---|
| Magnesium nitrate hexahydrate | 25% by weight |
| Triethylene glycol monobutyl ether | 5% by weight |
| Glycerin | 20% by weight |
| Ion-exchanged water | Balance |
| Reaction solution D-2 | |
| Calcium nitrate tetrahydrate | 10% by weight |
| Triethylene glycol monobutyl ether | 10% by weight |

-continued

| Glycerin | 10% by weight |
|---|---|
| Triethylene glycol | 0.9% by weight |
| Ion-exchanged water | Balance |
| Reaction solution D-3 | |
| Magnesium acetate tetrahydrate | 20% by weight |
| Triethylene glycol monobutyl ether | 10% by weight |
| Glycerin | 10% by weight |
| Ion-exchanged water | Balance |
| Reaction solution D-4 | |
| Calcium nitrate tetrahydrate | 5% by weight |
| Triethylene glycol monobutyl ether | 10% by weight |
| Glycerin | 20% by weight |
| Triethanolamine | 0.9% by weight |
| Ion-exchanged water | Balance |

Evaluation Tests on Print

Evaluation D-1:

Circularity

Printing was carried out on two types of papers (Xerox 4024 3R 721 (manufactured by Xerox Corp.) and Xerox R (manufactured by Xerox Corp., recycled paper) by means of an ink jet printer MJ-700V2C (manufactured by Seiko Epson Corporation). In the printing, the reaction solution was first printed (100% duty), and dots were then printed using the ink composition. For comparison, dot printing was directly carried out without printing of the reaction solution.

The circularity of the dots thus formed by the ink composition was determined according to the following equation.

$$\text{Circularity} = 4\pi S/(L^2)$$

wherein S represents the area of the dot and L represents the perimeter of the dot. The circularity was evaluated based on the following criteria:

○: Circularity of 1 to 0.9 for both papers,

Δ: Circularity of 0.9 to 0.8 for any one of or both the papers, and

×: Circularity of less than 0.8 for any one of or both the papers.

The results were as tabulated in Table 4.

Evaluation D-2:

Print Quality (Feathering)

The evaluation was performed in the same manner as described above in connection with the evaluation A-1.

Evaluation D-3:

Color Bleeding

The evaluation was performed in the same manner as described above in connection with the evaluation A-5.

Evaluation D-4:

Print Quality (OD)

The reaction solution was printed (100% duty) by means of an ink jet printer MJ-700V2C on the papers used in the above evaluation A-2, and a letter was then printed with the black ink. After drying, the reflection optical density (OD) of the prints was measured with Macbeth PCMII (manufactured by Macbeth).

TABLE 4

|  | Black ink | Color ink | Reaction solution | Evaluation 1: Circularity | Evaluation 2: Feathering | Evaluation 3: Color bleeding | Evaluation 4: OD |
|---|---|---|---|---|---|---|---|
| Example D-1 | D-1 | D-1 | D-1 | ○ | ○ | ○ | 1.58 |
| Example D-2 | D-2 | D-1 | D-2 | ○ | ○ | ○ | 1.55 |
| Example D-3 | D-3 | D-2 | D-3 | ○ | ○ | ○ | 1.54 |
| Example D-4 | D-1 | D-2 | D-4 | ○ | ○ | ○ | 1.55 |
| Example D-5 | D-4 | D-3 | D-1 | Δ | ○ | ○ | 1.44 |
| Comparative Example D-1 | D-1 | D-2 | — | Δ | ○ | X | 1.35 |

Example E

Glycerin, diethylene glycol, triethylene glycol, 1,5-pentanediol, and 1,4-butanediol used in the following examples and comparative example had a vapor pressure of not more than 0.1 mmHg at 20° C.

A reaction solution was prepared by mixing the following ingredients together, stirring the mixture at room temperature for 1 hr, and then filtering the resultant composition at room temperature by means of suction through a 5-μm membrane filter.

Reaction Solution E-1

| Magnesium nitrate hexahydrate | 25% by weight |
|---|---|
| (magnesium nitrate: 14.5% by weight) | |
| Triethylene glycol monobutyl ether | 10% by weight |
| Glycerin | 14.5% by weight |
| Pure water | 50.5% by weight |
| Wetting agent/salt = 1.00 | |

Reaction solution E-2

| Calcium nitrate tetrahydrate | 12% by weight |
|---|---|
| (calcium nitrate: 8.2% by weight) | |
| Triethylene glycol monobutyl ether | 10% by weight |
| Diethylene glycol | 25% by weight |
| Pure water | 53% by weight |
| Wetting agent/salt = 3.05 | |

Reaction solution E-3

| Magnesium acetate tetrahydrate | 15% by weight |
|---|---|
| (magnesium acetate: 10% by weight) | |
| Triethylene glycol monobutyl ether | 8% by weight |
| Triethylene glycol | 10% by weight |
| Maltitol | 5% by weight |
| Sucrose | 2% by weight |
| Pure water | 60% by weight |
| Wetting agent/salt = 1.70 | |

Reaction solution E-4

| Calcium acetate monohydrate | 8% by weight |
|---|---|
| (calcium acetate: 7.1% by weight) | |
| Triethylene glycol monobutyl ether | 5% by weight |
| 1,5-Pentanediol | 15% by weight |
| Pure water | 72% by weight |
| Wetting agent/salt = 2.11 | |

Reaction solution E-5

| Magnesium acetate tetrahydrate | 15% by weight |
|---|---|
| (magnesium acetate: 10% by weight) | |
| Triethylene glycol monobutyl ether | 5% by weight |
| 1,4-Butanediol | 22% by weight |
| Pure water | 58% by weight |
| Wetting agent/salt = 2.2 | |

Black ink E-1

| Carbon black MA7 | 5% by weight |
|---|---|
| (manufactured by Mitsubishi Kasei Corp.) | |
| Styrene/acrylic acid copolymer | 1% by weight |
| (dispersant) | |
| Voncoat 4001 | 30% by weight |
| (acrylic resin emulsion, resin component: 50%, MFT = 5° C., manufactured by Dainippon Ink and Chemicals, Inc.) | |
| Sucrose | 0.7% by weight |
| Maltitol | 6.3% by weight |
| Glycerin | 10% by weight |
| 2-Pyrrolidone | 2% by weight |
| Ethanol | 4% by weight |
| Pure water | Balance |

The ink was prepared in the same manner as described above in black ink A-1.

Evaluation tests

The above reaction solutions were evaluated as follows.

Evaluation E-1:

Precipitation of Salt

The reaction solution (1 μl) was spotted on a glass plate, allowed to stand under normal temperature and humidity conditions, and then observed for the precipitation of salt 3 days and 7 days after the initiation of standing. As a result, for all the examples, the precipitation of salt was not observed both 3 days and 7 days after the initiation of standing.

Evaluation E-2:

Clogging Property

A head of an ink jet printer MJ-500 (manufactured by Seiko Epson Corp.) was filled with the reaction solution and allowed to stand under an environment of 40C for one week. Thereafter, cleaning operation was repeated until successful ejection through all the head nozzles could be resumed. As a result, for all the examples, the number of necessary cleaning operations was 3 or less.

Evaluation E-3:

Curling of Paper

Solid printing of the above reaction solution was carried out by means of an ink jet printer MJ-500C on the following papers (size A4 for all the papers).

(1) Xerox P (Xerox Corp.)
(2) Xerox R (Xerox Corp.)
(3) Xerox 4024 (Xerox Corp.)
(4) Yamayuri (Honshu Paper Co., Ltd.)
(5) Conqueror (Arjo Wiggins)

The prints were allowed to stand on a flat surface under normal temperature and humidity conditions, and the degree of curling for the papers was measured one hr after the initiation of standing and 24 hr after the initiation of standing. Specifically, the distance, in a perpendicular direction, of the paper in its portion, which is in contact with the flat surface, from the top of the curl was measured and evaluated based on the following criteria.

⊚: Distance of 0 to 10 mm, and
o: Distance of 10 to 20 mm,

The results were as tabulated in Table 5. In this connection, it should be noted that when the degree of curling is not less than 40 mm, the recording paper unfavorably becomes tubular.

TABLE 5

| | Evaluation 3: Curling of paper | |
|---|---|---|
| Example | After 1 hr | After 24 hr |
| E-1 | ⊚ | o |
| E-2 | ⊚ | ⊚ |
| E-3 | ⊚ | o |
| E-4 | ⊚ | o |
| E-5 | ⊚ | ⊚ |

Evaluation E-4:
Feathering of Print

The reaction solutions and the black ink E-1 indicated in the examples were printed by means of an ink jet printer MJ-500C (manufactured by Seiko Epson Corporation) to inspect whether or not feathering occurred.

The five plain papers as used in Evaluation E-3 were used as the recording paper. As a result, for all the recording papers, significant feathering, which deteriorates the image quality, was not observed in the prints.

Example F

| Black ink F-1 | |
|---|---|
| Carbon black MA7 (manufactured by Mitsubishi Kasei Corp.) | 5% by weight |
| Styrene/acrylic acid copolymer (dispersant) | 1% by weight |
| Voncoat 4001 (acrylic resin emulsion, resin component: 50%, MFT = 5° C., manufactured by Dainippon Ink and Chemicals, Inc.) | 30% by weight |
| Sucrose | 0.7% by weight |
| Maltitol | 6.3% by weight |
| Glycerin | 10% by weight |
| 2-Pyrrolidone | 2% by weight |
| Ethanol | 4% by weight |
| Pure water | Balance |

The ink was prepared in the same manner as described above in black ink A-1.

A reaction solution having the following composition was prepared by mixing the following ingredients together, stirring the mixture at room temperature for 1 hr, and then filtering the resultant composition at room temperature by means of suction through a 5-μm membrane filter.

| Reaction solution F-1 | |
|---|---|
| Magnesium nitrate hexahydrate | 25% by weight |
| Triethylene glycol monobutyl ether | 10% by weight |
| Glycerin | 20% by weight |
| Triethanolamine | 0.9% by weight |
| Pure water | Balance |

| Reaction solution F-2 | |
|---|---|
| Magnesium nitrate hexahydrate | 5% by weight |
| Triethylene glycol monobutyl ether | 10% by weight |
| Glycerin | 10% by weight |
| Triethanolamine | 0.9% by weight |
| Pure water | Balance |

| Reaction solution F-3 | |
|---|---|
| Magnesium acetate tetrahydrate | 20% by weight |
| Triethylene glycol monobutyl ether | 10% by weight |
| Glycerin | 10% by weight |
| Pure water | Balance |

| Reaction solution F-4 | |
|---|---|
| Calcium nitrate tetrahydrate | 10% by weight |
| Triethylene glycol monobutyl ether | 10% by weight |
| Glycerin | 10% by weight |
| Triethanolamine | 0.9% by weight |
| Pure water | Balance |

| Reaction solution F-5 | |
|---|---|
| Calcium lactate pentahydrate | 2% by weight |
| Triethylene glycol monobutyl ether | 10% by weight |
| Glycerin | 20% by weight |
| Triethanolamine | 0.5% by weight |
| Pure water | Balance |

| Reaction solution F-6 | |
|---|---|
| Calcium formate anhydride | 5% by weight |
| Triethylene glycol monobutyl ether | 10% by weight |
| Glycerin | 20% by weight |
| Triethanolamine | 0.9% by weight |
| Pure water | Balance |

| Reaction solution F-7 | |
|---|---|
| Magnesium benzoate trihydrate | 2% by weight |
| Triethylene glycol monobutyl ether | 10% by weight |
| Glycerin | 10% by weight |
| Triethanolamine | 0.5% by weight |
| Pure water | Balance |

| Reaction solution F-8 | |
|---|---|
| Calcium chloride anhydride | 10% by weight |
| Triethylene glycol monobutyl ether | 10% by weight |
| Glycerin | 20% by weight |
| Triethanolamine | 0.9% by weight |
| Pure water | Balance |

| Reaction solution F-9 | |
|---|---|
| Magnesium sulfate heptahydrate | 10% by weight |
| Triethylene glycol monobutyl ether | 10% by weight |
| Glycerin | 20% by weight |
| Triethanolamine | 0.9% by weight |
| Pure water | Balance |

Evaluation Tests on Print
Evaluation F-1:
Print Quality (Feathering)

The evaluation was performed in the same manner as described above in Evaluation A-1, except that the printing was carried out at a density of 360 dpi (dot/in.) with the amount of the ink ejected per dot being 0.11 to 0.13 μg.

Evaluation F-2:
Print Quality (OD)

The evaluation was performed in the same manner as described above in Evaluation A-2, except that the prints obtained in the evaluation F-1 were used.

Evaluation F-3:
Unevenness of Printing

The evaluation was performed in the same manner as described above in Evaluation A-3.

Evaluation F-4:
Clogging Property

A head of an ink jet printer MJ-700V2C was filled with a predetermined ink, and alphanumeric characters were continuously printed for 10 min. Thereafter, the printer was stopped and allowed to stand without capping under an environment of 40° C. and 25% Rh for one week to one month. Thereafter, the printing of alphanumeric characters was resumed. In this case, the number of cleaning operations necessary for providing prints having a quality equal to the prints before standing was determined and evaluated based on the following criteria.

⊚: 0 to 2 times,
○: 3 to 5 times, and
x: Impossible to provide prints having a quality equal to the quality of the print before standing even after 6 or more repeated cleaning operations.

TABLE 6

| Example | Reaction solution | Evaluation 1: Feathering | Evaluation 2: OD | Evaluation 3: Unevenness of printing | Evaluation 4: Clogging property | | |
|---|---|---|---|---|---|---|---|
| | | | | | 1 week | 2 weeks | 1 month |
| F-1 | F-1 | ○ | 1.54 | ○ | ⊚ | ⊚ | ⊚ |
| F-2 | F-2 | ○ | 1.41 | Δ | ⊚ | ⊚ | ⊚ |
| F-3 | F-3 | ○ | 1.55 | ○ | ⊚ | ⊚ | ⊚ |
| F-4 | F-4 | ○ | 1.46 | ○ | ⊚ | ⊚ | ⊚ |
| F-5 | F-5 | Δ | 1.37 | ○ | ⊚ | ⊚ | ○ |
| F-6 | F-6 | ○ | 1.43 | ○ | ⊚ | ⊚ | ○ |
| F-7 | F-7 | Δ | 1.36 | Δ | ⊚ | ⊚ | ⊚ |
| F-8 | F-8 | ○ | 1.55 | ○ | ○ | X | X |
| F-9 | F-9 | ○ | 1.41 | Δ | ○ | X | X |

Example G

Reaction solutions and the ink compositions were prepared according to the following formulations. Specifically, the following ingredients were mixed together. In the case of ink compositions, however, a dispersion of a pigment was previously prepared with the aid of a dispersant and mixed with other ingredients. The mixture was stirred with heating at 60° C. for one hr, and the resultant composition was filtered at room temperature by means of suction through a 5-μm membrane filter to prepare a reaction solution or an ink composition.

| Reaction solution G-1 | |
|---|---|
| Magnesium acetate tetrahydrate | 2% by weight |
| Surfynol 465 | 0.8% by weight |
| (manufactured by Air Product and Chemicals, Inc.) | |
| Diethylene glycol | 10% by weight |
| Pure water | Balance |
| Viscosity: 1.6 mPa · s | |
| Surface tension: 29 mN/m | |
| Reaction solution G-2 | |
| Calcium chloride anhydride | 2% by weight |
| Diethylene glycol monobutyl ether | 20% by weight |
| Diethylene glycol | 10% by weight |
| Pure water | Balance |
| Viscosity: 3.6 mPa · s | |
| Surface tension: 32 mN/m | |
| Reaction solution G-3 | |
| Calcium nitrate tetrahydrate | 5% by weight |
| Triethylene glycol monobutyl ether | 10% by weight |
| Surfynol 465 | 1% by weight |
| Glycerin | 10% by weight |
| Pure water | Balance |
| Viscosity: 2.6 mPa · s | |
| Surface tension: 31 mN/m | |
| Reaction solution G-4 | |
| Calcium chloride anhydride | 2% by weight |
| Glycerin | 35% by weight |
| 1-Propanol | 10% by weight |
| Pure water | Balance |
| Viscosity: 5.8 mPa · s | |
| Surface tension: 35 mN/m | |
| Black ink G-1 | |
| C.I. Food Black 2 | 2% by weight |
| Voncoat 4001 | 6% by weight |
| (acrylic resin emulsion, resin component: 50%, MFT = 5° C., manufactured by Dainippon Ink and Chemicals, Inc.) | |
| 2-Pyrrolidone | 5% by weight |
| Pure water | Balance |
| Viscosity: 1.6 mPa · s | |
| Surface tension: 55 mN/m | |
| Black ink G-2 | |
| Carbon black Raven 1080 | 5% by weight |
| Styrene/acrylic acid copolymer (dispersant) | 1% by weight |
| Microgel E-5002 | 3.5% by weight |
| (styrene/acrylic resin emulsion, resin component: 29.2%, MFT = about 80° C., manufactured by Nippon Paint Co., Ltd.) | |
| Sucrose | 0.7% by weight |
| Maltitol | 6.3% by weight |
| Glycerin | 10% by weight |
| 2-Pyrrolidone | 2% by weight |
| Ethanol | 4% by weight |
| Pure water | Balance |
| Viscosity: 3.6 mPa · s | |
| Surface tension: 50 mN/m | |
| Black ink G-3 | |
| Carbon black Raven 1080 | 5% by weight |
| Styrene/acrylic acid copolymer (dispersant) | 1% by weight |
| Microgel E-5002 | 3.5% by weight |
| (styrene/acrylic resin emulsion, resin component: 29.2%, MFT = about 80° C., manufactured by Nippon Paint Co., Ltd.) | |
| Maltitol | 3% by weight |
| Glycerin | 10% by weight |
| 1-Propanol | 5% by weight |

-continued

| | |
|---|---|
| Pure water | Balance |
| Viscosity: 2.6 mPa · s | |
| Surface tension: 40 mN/m | |
| Black ink G-4 | |
| | |
| Carbon black Raven 1080 | 5% by weight |
| Styrene/acrylic acid copolymer (dispersant) | 1% by weight |
| Microgel E-5002 (styrene/acrylic resin emulsion, resin component: 29.2%, MFT= about 80° C., manufactured by Nippon Paint Co., Ltd.) | 3.5% by weight |
| Maltitol | 15% by weight |
| Glycerin | 10% by weight |
| Pure water | Balance |
| Viscosity: 5.8 mPa · s | |
| Surface tension: 58 mN/m | |

Evaluation Tests on Print

Evaluation G-1:

Print Quality (Feathering)

The evaluation was performed in the same manner as described above in Evaluation A-1.

Evaluation G-2:

Print Wuality (OD)

The evaluation was performed in the same manner as described above in Evaluation A-2.

Evaluation G-3:

Unevenness of Printing

The evaluation was performed in the same manner as described above in Evaluation B-3.

Evaluation G-4:

Rubbing Property

The evaluation was performed in the same manner as described above in Evaluation A-4.

TABLE 7

| Example | Reaction solution | Black ink | Evaluation 1: Feathering | Evaluation 2: OD | Evaluation 3: Unevenness of printing | Evaluation 4: Rubbing resistance |
|---|---|---|---|---|---|---|
| G-1 | G-1 | G-1 | Δ | 1.33 | ⊚ | ○ |
| G-2 | G-2 | G-2 | ○ | 1.42 | ⊚ | ○ |
| G-3 | G-3 | G-3 | ○ | 1.42 | ⊚ | ○ |
| G-4 | G-4 | G-4 | ○ | 1.45 | ○ | Δ |

Example H

| | |
|---|---|
| Black ink H-1 | |
| | |
| Carbon black Raven 1080 (manufactured by Columbian Carbon) | 5% by weight |
| Styrene/acrylic acid copolymer (dispersant) | 1% by weight |
| Microgel E-5002 (styrene/acrylic resin emulsion, resin component: 29.2%, MFT= about 80° C., manufactured by Nippon Paint Co., Ltd.) | 10% by weight |
| Sucrose | 0.7% by weight |
| Maltitol | 6.3% by weight |
| Glycerin | 10% by weight |
| 2-Pyrrolidone | 2% by weight |
| Ethanol | 4% by weight |
| Pure water | Balance |

The ink was prepared in the same manner as described above in black ink A-1.

A reaction solution having the following composition was prepared by mixing the following ingredients together, stirring the mixture at room temperature for 1 hr, and then filtering the resultant composition at room temperature by means of suction through a 5-$\mu$m membrane filter.

| Reaction solution H-1 | |
|---|---|
| Magnesium nitrate hexahydrate (magnesium nitrate: 14.5% by weight) | 25% by weight |
| Triethylene glycol monobutyl ether | 10% by weight |
| Glycerin | 14.5% by weight |
| Pure water | Balance |

Evaluation Tests on Print

Printing was carried out on the following various papers using an ink jet printer MJ-700V2C (manufactured by Seiko Epson Corporation). In the printing, the reaction solution H-1 was first printed (100% duty), and the black ink was used to print a letter. In this case, for both the reaction solution H-1 and the ink H-i, the amount of the ink ejected per dot was 0.05 to 0.07 pg with the density being 360 dpi (dot/in.). In the step of heating, the heating method and temperature were varied as described below and as indicated in the table below. Papers for printing test: -

(1) Xerox P Paper (Xerox Corp.)
(2) Ricopy 6200 Paper (Ricoh Co. Ltd.)
(3) Xerox 4024 Paper (Xerox Corp.)
(4) Neenah Bond Paper (Kimberly-Clark)
(5) Xerox R Paper (Xerox Corp., recycled paper)
(6) Yamayuri (Honshu Paper Co., Ltd., recycled paper)

The heating temperature and method were as follows.

Example H-1:

The print was passed over a heat roller of 150° C. at 10 cm/sec.

Example H-2:

Warm air of 170° C. was blown against the print.

The resultant prints were evaluated for the rubbing resistance and the print quality as follows.

Further, as Comparative Example H-1, the above black ink alone was printed, and the print was heated in the same manner as in Example H-1 and then evaluated in the same manner as in Example H-1.

Evaluation H-1:

Rubbing Resistance Test (Line Marking Resistance)

The printed letter was rubbed with a water-base yellow fluorescent marker pen (ZEBRA PEN 2 (trademark)) manufactured by ZEBRA at a marking force of $4.9 \times 10^5$ N/m$^2$, and the degree of stain in the yellow area was observed. The results were evaluated based on the following criteria.

○: No stain created by marking twice,
Δ: No stain created by marking once with some paper being stained by marking twice or more, and
x: Some paper stained by marking once.

Evaluation H-2:
Print Quality (OD)

The reflection optical density (OD) of the prints was measured with Macbeth PCMII (manufactured by Macbeth). The results were as tabulated in Table 8.

TABLE 8

| | Reaction solution | Black ink | Heat temp. | Evaluation 1: Rubbing resistance | Evaluation 2: OD |
|---|---|---|---|---|---|
| Example H-1 | H-1 | H-1 | 150° C. | ○ | 1.44 |
| Example H-2 | H-1 | H-1 | 170° C. | ○ | 1.44 |
| Comparative Example H-1 | - | H-1 | 150° C. | X | 1.22 |

What is claimed is:

1. An ink tank for mounting in an ink jet recording apparatus for practicing an ink jet recording method wherein a reaction solution and an ink composition are deposited onto a recording medium, wherein the reaction solution and the ink composition is accommodated in the apparatus in such amounts that the ink composition is used up earlier than the reaction solution.

2. The ink tank according to claim 1, which is integral with an ink jet recording head.

3. An ink tank, comprising at least a first ink composition and a reaction solution, for mounting in an ink jet recording device that comprises recording head means for ejecting and depositing the ink composition and the reaction solution onto a recording medium with a resultant consumption of the ink composition and the reaction solution in the tank, the reaction solution and the ink composition being accommodated in the tank in respective amounts such that the ink composition is used up before the reaction solution when the ink tank is mounted in the device and the recording head means deposits the ink composition and reaction solution onto the recording medium with the resultant consumption of the ink composition and the reaction solution.

4. An ink tank according to claim 3, wherein the reaction solution is transparent and the ink composition is not.

5. An ink tank according to claim 4, wherein the tank comprises a plurality of chambers, a first of said chambers accommodating the ink composition and a second of the chambers accommodating the reaction solution.

6. An apparatus comprising the ink tank of claim 3 and an inkjet recording head, the ink tank being integral with the recording head.

7. An apparatus comprising the ink tank of claim 3 and the inkjet recording device that comprises the recording head means for ejecting and depositing the ink composition and the reaction solution onto the recording medium, the ink tank being mounted in the ink jet recording device such that the ink composition is used up before the reaction solution when the recording head means ejects and deposits the ink composition and the reaction solution onto the recording medium.

8. The apparatus according to claim 7, wherein the recording head means selectively deposits the reaction solution only on an area of the recording medium where it deposits the ink composition.

* * * * *